United States Patent
Carmack et al.

(10) Patent No.: US 12,034,740 B1
(45) Date of Patent: Jul. 9, 2024

(54) DISTRIBUTED DENIAL OF SERVICE MITIGATION IN A CONTAINER BASED FRAMEWORK

(71) Applicant: Amazon Technologies, Inc., Seattle, WA (US)

(72) Inventors: Scott Gerard Carmack, Mercer Island, WA (US); Narasimha Rao Lakkakula, Bothell, WA (US); Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/083,098

(22) Filed: Mar. 28, 2016

(51) Int. Cl.
*H04L 9/00* (2022.01)
*H04L 9/40* (2022.01)

(52) U.S. Cl.
CPC ...... *H04L 63/1416* (2013.01); *H04L 63/1458* (2013.01)

(58) Field of Classification Search
CPC .................. H04L 63/1416; H04L 63/1458
See application file for complete search history.

(56) References Cited

U.S. PATENT DOCUMENTS

| | | | | |
|---|---|---|---|---|
| 9,363,280 B1 * | 6/2016 | Rivlin | ................. | H04L 63/1441 |
| 9,703,592 B2 * | 7/2017 | Cropper | .............. | G06F 9/45558 |
| 9,898,224 B1 * | 2/2018 | Marshak | ............... | G06F 3/0647 |
| 9,928,100 B2 * | 3/2018 | Dow | .................... | G06F 9/45533 |
| 2009/0222558 A1 * | 9/2009 | Xu | ....................... | H04L 63/1458 718/1 |
| 2012/0011254 A1 * | 1/2012 | Jamjoom | .............. | G06F 9/4856 709/226 |
| 2012/0297238 A1 * | 11/2012 | Watson | ................. | G06F 9/5088 714/4.11 |
| 2014/0026133 A1 * | 1/2014 | Parker | .................. | G06F 9/5083 718/1 |
| 2014/0053269 A1 * | 2/2014 | Ghosh | ................ | H04L 63/1416 726/23 |
| 2014/0173095 A1 * | 6/2014 | Steuer | .................. | G06Q 10/103 709/224 |
| 2014/0282539 A1 * | 9/2014 | Sonnek | ............... | G06F 9/45558 718/1 |
| 2014/0283051 A1 * | 9/2014 | Doron | ................. | H04L 63/1458 726/23 |
| 2017/0078198 A1 * | 3/2017 | Nellikar | ................ | H04L 45/745 |
| 2017/0134403 A1 * | 5/2017 | Hearn | ................. | H04L 63/1425 |

* cited by examiner

*Primary Examiner* — Daniel B Potratz
*Assistant Examiner* — Syed M Ahsan
(74) *Attorney, Agent, or Firm* — Davis Wright Tremaine LLP

(57) ABSTRACT

In response to a process being triggered, at least in part by receipt of information regarding communication directed to a first application by a second application, a threat level is computed based at least in part on the information. As a result of the threat level being of a first severity, the second application is migrated to a destination zone that allows for improved communications with the first application. As a result of the threat level being of a second severity, migration of the second application to the destination zone is delayed. As a result of the threat level being of a third severity, a mitigation action is performed.

22 Claims, 12 Drawing Sheets

US 12,034,740 B1

DISTRIBUTED DENIAL OF SERVICE MITIGATION IN A CONTAINER BASED FRAMEWORK

BACKGROUND

Containerization presents new opportunities for efficient cloud-based computing. Software containers are lightweight, virtualized execution environments for applications, allowing the applications to efficiently cohabitate on a same physical or virtual instance of a computing device. In order to reduce network latency of communications between applications executing in separate software containers, the applications may be migrated to be closer in proximity to the applications with which they are communicating. This presents a risk of unintentionally facilitating a denial of service attack. However, conventional techniques, such as filtering all network traffic through a central point that attempts to identify and filter out bad network traffic, can be resource-intensive and expensive, and often requires high-capacity, dedicated equipment that takes up valuable space in a data center and often becomes a bottleneck between hosts and users.

BRIEF DESCRIPTION OF THE DRAWINGS

Various techniques will be described with reference to the drawings, in which.

DETAILED DESCRIPTION

Figure 1:
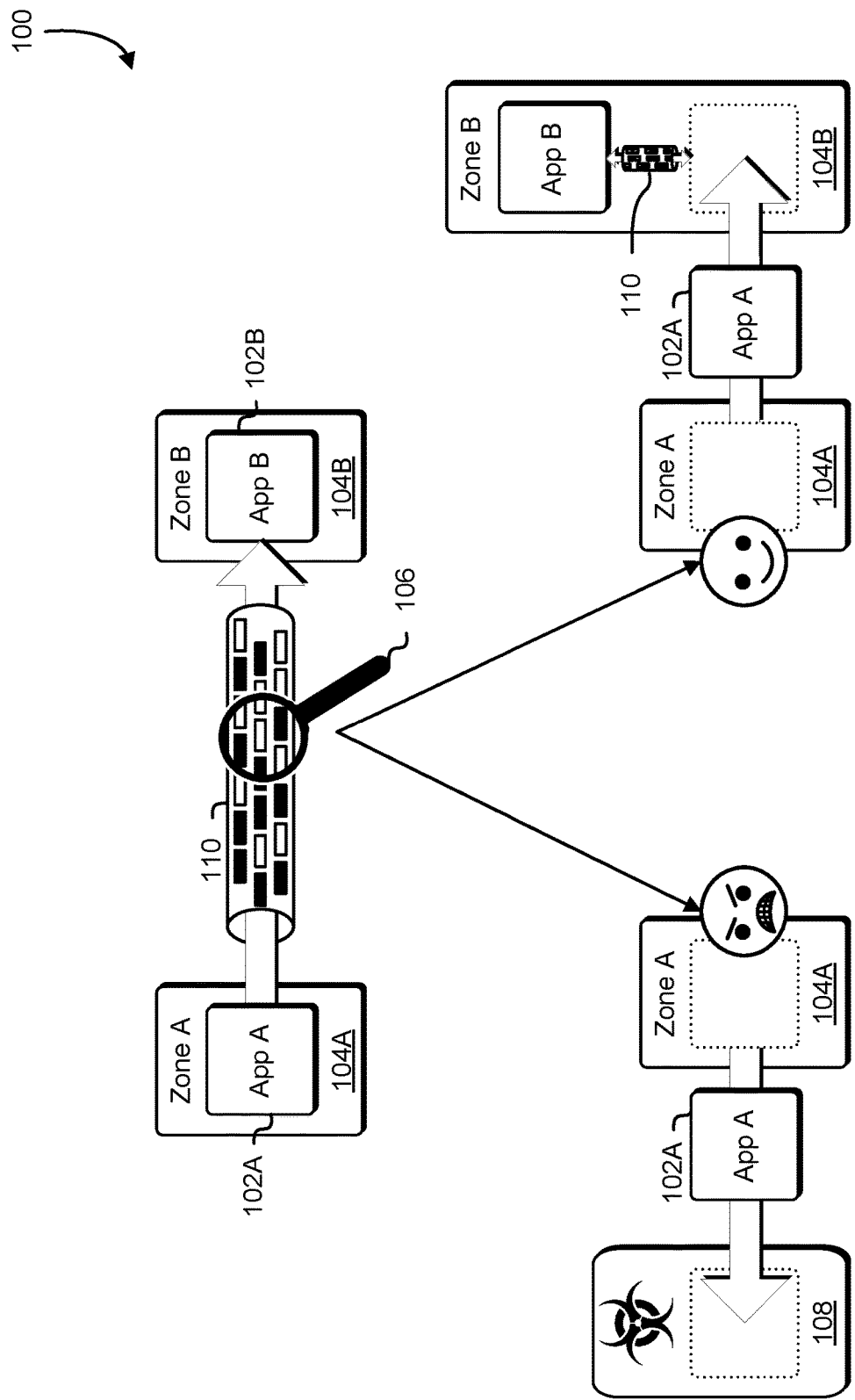
FIG. 1 illustrates an example of application migration in accordance with an embodiment.

This disclosure relates to mitigation of security threats in a distributed computing environment that performs self-optimizing, dynamic migration of applications. In one example, a system of the present disclosure may receive tracking metrics from a software agent executing on a same physical host as a first software container. The tracking metrics may include measurements and other information relating to communications directed to a first software application executing in the first software container from a second software application executing in a second software container that is different from the first software container. For example, the tracking metrics could include one or more latency measurements, number of hops in the path from the source to the destination, frequency of communication between the second software application to the first software application (e.g., 1,000 requests per second), an amount of data transferred from or to the first software application, etc. The first software container and the second software container may be managed by a computing resource service provider through a container service provided by the computing resource service provider.

The system may determine, based on the metrics, whether a trigger has been met for initiating migration of the second software application to a zone that allows for improved communications (e.g., faster speed, lower latency, less signal noise, more reliable infrastructure, etc.) between the second software application and the first software application. The trigger may be met by determining that communications between the first software application and the second software application exceed, or otherwise reach a predetermined value relative to, a threshold in data volume (e.g., a number of bytes of data transferred in a given time period) or communication frequency (e.g., number of requests per time period).

As a result of the trigger being met, the system may compute, based on the communications, a denial of service threat level. The denial of service threat level may reflect a likelihood that the second software application poses a threat to the stability of the first software application or the ability of the first software application to respond to legitimate requests. Depending on severity of threat (e.g., as may be determined by one or more threshold), one or more of a variety of actions may be performed. For example, as a result of the denial of service threat level being of a first severity, the system may cause the second software application to be migrated to the zone that allows for improved communications (e.g., reduced latency between the first software application and the second software application). The zone may be a zone in which the first software application is currently executing. There may be multiple hierarchies of zones, and zones may overlap. Zones may range in exclusivity; for example, a zone that is a data center may be more inclusive than a zone that is a software container. Thus, in some cases, the zone may be the first software container.

As another example, as a result of the denial of service threat level being of a second severity, the system may delay migration of the second software application for a predetermined period. This predetermined period may be a fixed period of time, may be a period of time specified by a customer-owner of the first software application, may be a monitoring period of indeterminate time until the second software application is determined to not pose an unacceptable level of threat to the first software application, or some other period of time. As still another example, as a result of the denial of service threat level being of a third severity, the system may cause a denial of service mitigation action to be performed. For example, the second software application may be blocked from communicating, throttled, or migrated to a quarantine zone. It must be noted that in some implementations of embodiments of the present disclosure, the customer-owner may also own the installation of the second software application. However, in other implementations, the second software application may belong to a different customer of the computing resource service provider. That is, the computing systems hosted by the computing resource service provider to provide the container service or the virtual computer system service may be multi-tenant (i.e., hosting applications of multiple customers simultaneously), and applications of multiple customers may share the same zone. In some implementations, applications of multiple customers may share the same software container running the same container instance.

Techniques described and suggested in the present disclosure improve the field of computing, specifically the field of computer security for cloud computing, by, among other things, actively monitoring and preventing threats against containerized software applications. Additionally, techniques described and suggested in the present disclosure improve the stability of cloud computing infrastructures by, upon detecting a denial of service attack against one application, proactively preventing the denial of service attacker from potentially attacking other applications. Moreover, techniques described and suggested in the present disclosure are necessarily rooted in computer technology in order to overcome problems specifically arising with migrating applications running in software containers to be more proximate to applications that they are targeting with their communications by ensuring that, prior to migration, the migrated applications do not pose a security threat to the applications they are targeting with their communications. In the present disclosure, the term "proximate" may refer to physical distance, an amount of network latency, an amount of bandwidth, etc. For example, if a first software application communicating with a second software application experiences a network delay/latency of 15 milliseconds, and a third software application communicating with the second software application experiences a network latency of 10 milliseconds, the third software application can be said to be more proximate to the second software application than the first software application is to the second software application.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an aspect of an embodiment 100 of the present disclosure. As illustrated in FIG. 1, the embodiment 100 may include tracking communications 110 between a first software application 102A located in a first zone 104A and a second software application 102B located in a second zone 104B. If an amount (e.g., frequency, volume, etc.) of communication between the first software application 102A and the second software application 102B indicates that migrating the first software application 102A to the second zone 104B could better facilitate (i.e., improve) communication between the software applications 102A-02B, a determination 106 may be made whether the first software application 102A presents a threat to the second software application 102B. Note that other criteria, such as processor usage and memory utilization, may be used to determine potential threats to software applications besides an amount of communication. That is, within the embodiment 100, a determination of a threat level (e.g., severity of the threat) of the first software application 102A is made.

Based on the threat level, various actions may be performed. For example, if the threat level is above a certain threshold (e.g., indicating a high severity threat), the first software application 102A may be migrated to a quarantine zone 108. On the other hand, if the threat level is below a certain threshold (e.g., indicating a low severity threat), the first software application may be migrated to the second zone 104B in order to better facilitate communication between the software applications 102A-02B. It is noted that there may be various levels of threats, with different actions performed based on the particular determined level of threat of the first software application. Note that while the embodiment 100 depicts the first software application 102A being migrated, it is contemplated that in some implementations, rather than migrating the first software application 102A, the second software application 102B will be migrated to be closer to or farther from (i.e., more or less proximate in communications) the first software application 102A.

In the present disclosure, the term "zone" may be used to refer to a logical division of physical or virtual resources in which a software application may be executed. Thus, each of the zones 104A-04B may refer to a particular geographic region, particular data center, a particular room in a data center, a particular set of server racks within the particular room, a particular rack within the set of server racks, a particular computing device within the rack, a particular virtual or non-virtual network of computing devices, a grouping of servers supported by a particular backup generator, a particular virtual machine instance executing on the computing device, or even a particular software container executing within the virtual machine instance. Depending on implementation, zones may be isolated from each other, overlap non-exclusively with other types of zones, on be nested entirely within other types of zones. An example of such zones can be seen in FIG. 3. Thus, in the example where the first software application 102A is migrated from the first zone 104A to the same zone as the second software application 102B, it may be that the first software application 102A is being migrated from a first data center to a second data center. Or, it may be that the first software application 102A and the second software application 102B already reside within the same data center, and the first software application 102A is being migrated from a first rack to a second rack hosting the second software application 102B.

Figure 3:
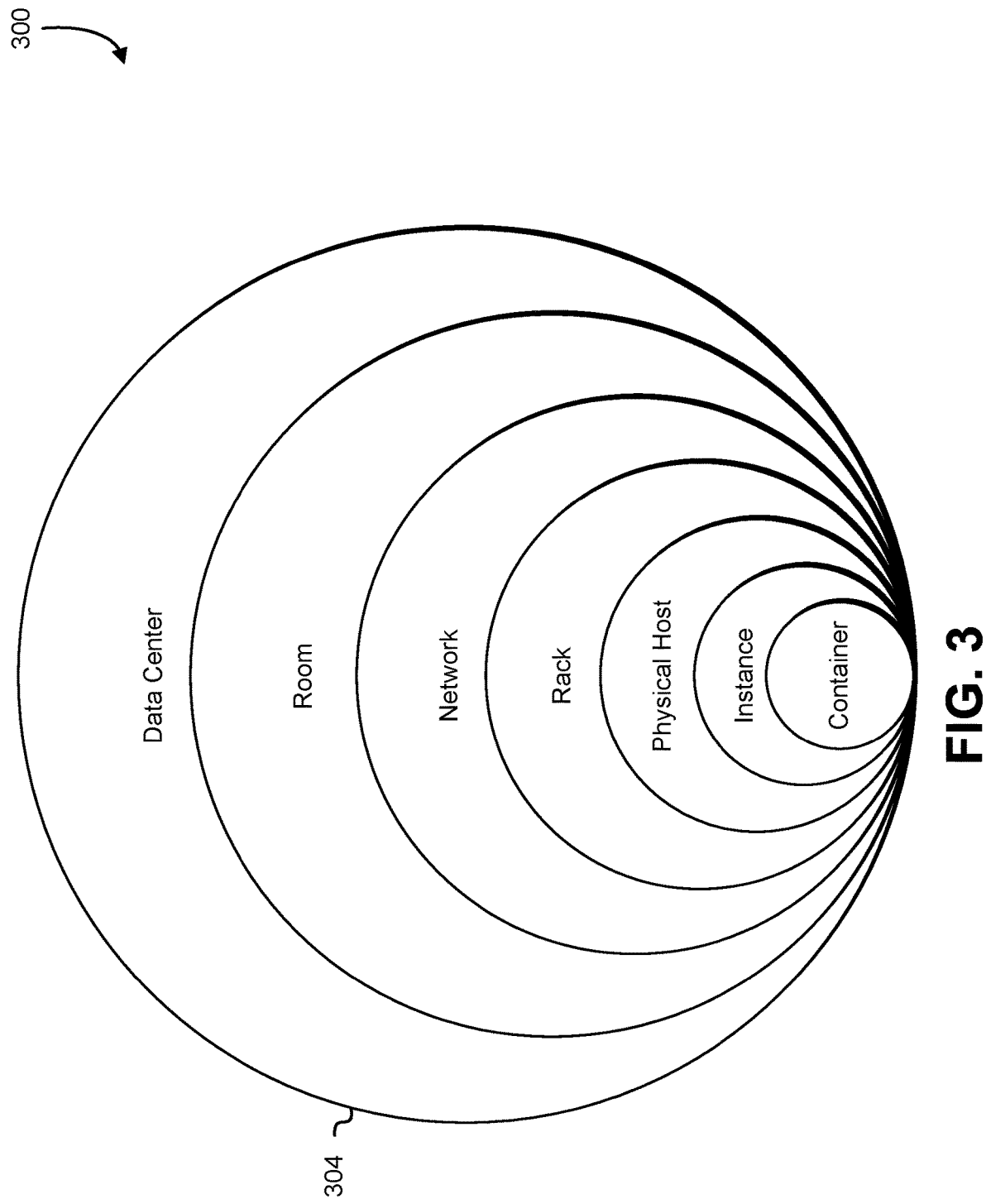
FIG. 3 illustrates an example of a hierarchy of zones in accordance with an embodiment.

Note that in FIG. 3, as the zones 304 become more granular, the "closer" the applications become, potentially improving communication performance between each other, but also potentially increasing the potential to cause harm, should one of the applications have a malicious objective or have security weaknesses. Consequently, the threat level corresponding to the determination 106 may reflect a varying degrees of threat, which may affect how "close" to migrate the first software application 102A to the second software application 102B. Note also, that the migration need not step through the degrees of closeness one at a time; in other words, the first software application 102A may initially be executing in a software container in a first data center, while the second software application 102B is executing in another software container in a second data center, and it may be determined, based on an estimated trustworthiness (e.g., lack of threat) of the first software application 102A, not to just migrate the first software application 102A into the same data center as the second software application, but to migrate the first software application 102A to the same virtual machine instance as the second software application 102B.

The software applications 102A-02B may be any applications configured to exchange communications (e.g., make remote function calls, submit requests, send messages, respond to requests, etc.) electronically with other applications or electronic devices. The communications 110 may include, as mentioned, function calls, requests, messages, data packets, etc. Examples of software applications include software for processing transactions related to online purchases, software for streaming media, a website, an interface to a database, and so on. Such software applications 102A-02B may be configured to execute within software containers. The determination 106 may be execution of a process for determining a likelihood that the first software application 102A is a threat to the second software application 102B, such as the process 900 of FIG. 9.

A "software container" (also referred to as a "container" for short) may be an isolated user space instance. In some examples, "user space" may refer to memory logically separated and allocated to a set of applications such that processes executing one user space cannot, unless explicitly allowed, access memory of applications executing in another user space, and vice versa. In other words, a software container may be a lightweight virtualization instance, itself running under a computer system instance that includes programs, data, and system libraries, with the software container having its own namespace, and applications running within the software container may be isolated from other processes by only having access to resources available within the software container namespace. A difference between a software container and a virtual machine is that, while the hypervisor of a virtual machine abstracts an entire hardware device, the software container engine may just abstract the operating system kernel. While software containers run in isolation from each other, they can share the same binaries and library files as needed. Consequently, the software container can be more efficient than a virtual machine in terms of resource usage. In an environment where a customer needs to run multiple copies of the same application, more applications can be run simultaneously in software containers than running the applications simultaneously in separate virtual machines using the same hardware.

When a software container is launched, the running program (i.e., the process) may be isolated from other processes running in the same computer system instance. In this manner, multiple software containers may each run under an operating system (e.g., using memory, CPU, and storage allocated by the operating system) of a container instance and execute in isolation from each other (e.g., each container may have an isolated view of the file system of the operating system). As noted, each of the containers may have its own namespace, and applications running within the containers may be isolated by only having access to resources available to the container namespace. In some examples, a "container encapsulation engine" may allow one or more containers to run within a single operating instance without the overhead associated with starting and maintaining virtual machines for running separate user space instances. An example of a container encapsulation engine is the Docker container engine.

Websites and computing resource service providers are frequently targets of denial of service attacks, which are attempts to overwhelm the second software application 102B, such that, the second software application 102B responds slowly, or not at all, to entities making legitimate communication requests. For example, when under a denial of service attack, web sites served by the second software application 102B may become unavailable or slow to load, or, in some cases, the second software application 102B may stop responding altogether. A distributed denial of service attack is an attack wherein denial of service attacks are made against the target (e.g., software application, computing device, website, etc.) from multiple systems, which are often infected by malicious software (malware) executing on computing systems of unsuspecting users. In some examples, a "botnet" may refer to malware that is configured to make coordinated actions against one or more targets. Because the distributed denial of service attacks can come from numerous sources, distinguishing a legitimate request from a request that is part of a distributed denial of service attacks can be difficult.

Distributed denial of service attacks are often made by "flooding" the target with communication requests. Common types of floods used in distributed denial of service attacks are synchronization flood (SYN flood), user datagram protocol flood (UDP flood), network time protocol (NTP) reflection, and simple network management protocol (SNMP) reflection attacks. A SYN flood is an attack where the attacking machines transmit a succession of synchronization (SYN) requests to the target. The target, interpreting the requests as legitimate, responds with a synchronization acknowledge (SYN-ACK) message. However, the attacking machines do not respond to the SYN-ACK message, causing the target to wait for some period of time while expecting a response. A multitude of repeated SYN requests can thereby tie up resources of the target to the point that legitimate connection requests cannot be made.

A UDP flood occurs when attacking machines, illustrated by the attackers, transmit many UDP packets to random ports of the target. In response, the target checks to see whether any application is expecting to receive the UDP packets at the receiving port, and responds with an internet control message protocol (ICMP) destination unreachable message. A multitude of repeated UDP attacks can thereby tie up resources of the target by causing it to provide multitudes of ICMP return packets.

An NTP reflection attack involves transmitting communication requests using a forged (spoofed) internet protocol address of the target to NTP servers, which are servers used by computers and other devices for clock synchronization and are often publicly available. The NTP server may respond to the communication requests, sent to it by attackers spoofing the destination address of the target, such as one or more of servers, by sending a relatively large amount of data to the target. For example, every time an NTP attacker provides a "monlist" (or MON_GETLIST) command to an NTP server, the NTP server may respond by transmitting addresses of up to the last 600 machines the NTP server has interacted with to the spoofed address of the target, thereby consuming the bandwidth of the target. In this manner, a multitude of NTP attacks may quickly consume large amounts of the target's bandwidth.

An SNMP reflection attack often involves botnets that send small SNMP queries to gateway devices using a source internet protocol address spoofed to be an internet protocol address of a target. The gateway devices respond by sending SNMP responses to the internet protocol address of the target. The SNMP response data may be much larger than the query data sent by the botnets and the bandwidth of the target may be inundated and overwhelmed by the SNMP data received.

Attackers may be botnets attacking one or more targets with a distributed denial of service attack, such as a SYN flood, UDP flood, or NTP reflection attack. Legitimate users, on the other hand, may be customers of the computer resource service provider attempting to access the targets for any of a variety of non-malicious purposes, such as online shopping, video or audio streaming, viewing news feeds, utilizing a search engine, file downloading, or browsing.

Thus, if the determined threat level indicates that the first software application 102A should not be migrated to the second zone 104B, various alternative actions may be performed depending on the threat level. If the threat level indicates with sufficient certainty (e.g., above a particular threshold) that the communications from the first software application 102A are part of a denial of service attack, the system of the present disclosure may block/ignore communications from the first software application 102A. Such blockage may be performed by blocking a port of communication used by the first software application 102A, blocking/ignoring communications originating from an Internet protocol address being used by the first software application 102A, or blocking/ignoring communications that match a particular digital fingerprint used in communications by the first software application 102A. Additionally, if the first software application 102A is executing within of the virtual computing system service of the computing resource service provider making the determination 106, the computing resource service provider may perform a scan and disable all occurrences of the particular first software application 102A executing within the virtual computing system service. Note that, in some examples, the term "match" may refer to values that correspond to a common characteristic (e.g., string of characters) and/or they satisfy one or more matching criteria. Generally, any way of determining whether there is a match may be used.

As noted, based on the determination of the threat level, other actions may be performed. FIG. 1 depicts one example whereby the first software application 102A is migrated from the first zone 104A to a quarantine zone 108. The quarantine zone 108 may be a zone, comprised of at least one computing system, configured to host applications suspected to have security flaws or be denial of service attackers (e.g., one or more software applications for which the determined threat level neither indicates that the communications 110 are not a threat (e.g., low severity) to the second software application 102B with sufficient certainty (e.g., below a particular threshold) nor that the communications 110 are a threat to the second software application 102B with sufficient certainty (e.g., above a particular threshold, indicating high severity)).

The quarantine zone 108 may provide an environment whereby the first software application 102A can be further monitored until it can be determined whether the first software application does or does not present a threat to the second software application 102B. That is, the quarantine zone 108 may be configured with specialized applications for monitoring communications of suspect applications and/or may be configured to throttle, block, or otherwise limit suspect communications and access to resources by the suspect applications within the quarantine zone 108. In some implementations, there are a plurality of quarantine zone. In some implementations, a suspect application could have an entire quarantine zone to itself, whereas in other implementations suspect applications can share the quarantine zone 108 with other suspect applications. As noted, a software application determined to be a "threat" need not be a deliberate attacker, but may be a software application with security weaknesses or other design flaws capable of unacceptably compromising the operations of the second software application 102B.

Figure 2:
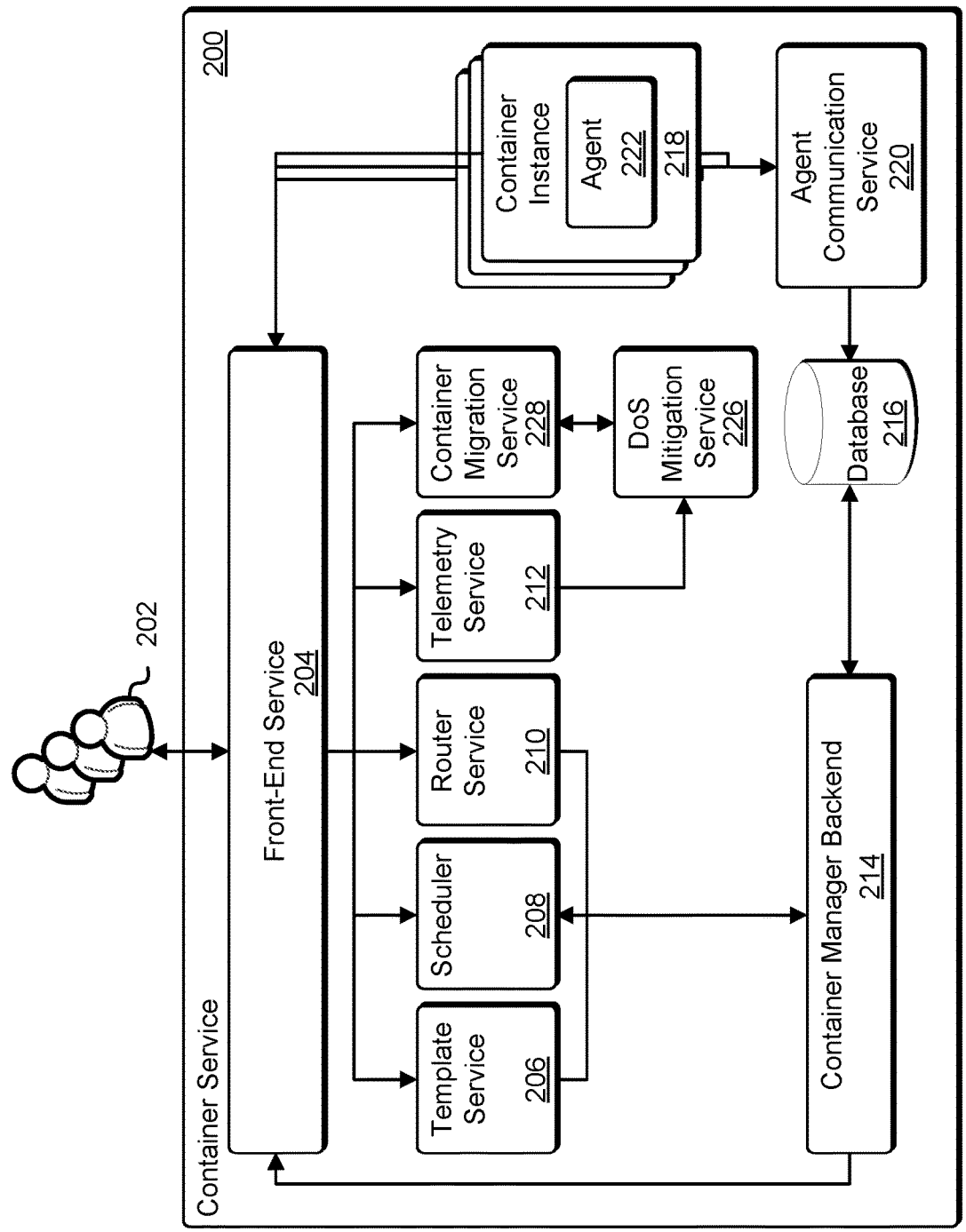
FIG. 2 illustrates an example of a container service in accordance with an embodiment.

FIG. 2 illustrates an example container service 200 of an embodiment of the present disclosure. As illustrated in FIG. 2, the environment of the example container service 200 may include customers 202 of a computing resource service provider communicating through a front-end service 204 to manage one or more containers within one or more container instances 218. In some examples, a "container instance" may refer to a computer system instance, virtual or non-virtual (e.g., a physical computer system running an operating system), that is configured to launch and run software containers. Thus, the one or more container instances 218 may be virtual machines configured to launch and execute software containers.

A container encapsulation system provided by or interfaced to the container service 200 may allow a customer to configure one or more applications within a container of an operating system which supports containers. The running processes and resources within the container may be isolated from other processes of the parent container instance and from the running processes and resources within other containers of the same host system. The customer may specify the amount of memory and processing capacity allocated to the container. The base container and the applications and data within it may then be packaged as an image, including one or more programs, data, and any system dependencies (e.g., libraries, files, etc.) that are needed for the programs to run on the operating system of the container instance. In some examples, an "image" may refer to an entire copy of a particular state of the base container at the time the image was generated. The image thereafter may be used to launch one or more identical containers, each of which may be assigned the specified amount of resources and may be isolated from each other. The containers may be launched on the same or different physical machines and each container may be expected to run in exactly the same way as the base container.

Each of the container instances 218 may be configured to contain one or more agents, such as the agent 222. The container service 200 may be comprised of a set of services, including a template service 206, one or more schedulers 208, a router service 210, a telemetry service 212, a container migration service, and a denial of service mitigation service 226. Because the container service 200 may be configured as a multitenant service (i.e., the resources of the container service 200 may serve multiple customers concurrently), and because the services provided by the container service 200 exist outside and separate from the container instances 218, the customers 202 need not install individual software applications within their respective container instances 218 to provide the functionality afforded by the services. The customers 202 may utilize the functionality provided by these services by making web service application programming interface function calls through the front-end service 204, which may be configured to receive requests from the customers 202 and forward the requests to the appropriate service, such as the appropriate container manager backend service 214.

The scheduler 208 may be configured to launch tasks within the described cluster. Alternatively, the customers 202 may implement their own scheduler, rather than the scheduler 208. The customer may design and/or upload a placement algorithm to be used by his/her own scheduler, or may select from a list of possible placement algorithms provided to the customer by the computing resource service provider. The container service 200 may determine, based on available resources, whether to accept or reject placement decisions made by the customer scheduler.

The scheduler 208 may be a multitenant service configured to optimally schedule a set of tasks to run with a cluster. In this way, the customers 202 need not choose where the tasks should be executed. The placement scheme of the scheduler 208 may be configured to distribute tasks evenly over the cluster (e.g., round robin fashion, stochastic distribution scheme, etc.), and may be configured to distribute tasks based on a current or projected resource consumption by the cluster, in order to make the most efficient use of available resources. The scheduler 208 may obtain cluster manager metadata and other information about the availability of the container instances 218 in a cluster via the container manager backend services 214. The cluster manager metadata and other information may include data about the current state of the container instances 218 assigned to the cluster, available resources within the container instances, containers running within the container instances, and other information usable by the scheduler 208 to make placement decisions.

The scheduler 208 may distribute tasks based on security rules, security groups, and/or security roles, have affinity, and anti-affinity. For example, tasks within a certain security group may be configured to be launched on the same container instance whenever possible or practicable, or, conversely, may be scheduled to be launched in separate container instances. As another example, tasks may be assigned to certain security groups or designated to have certain security roles, and, based on the particular security group assigned or security role designated, a task may be assigned to run in a specific cluster or specific cluster instances or may have priority for resources over other tasks. Task distribution based on affinity/anti-affinity include assigning "tags" indicating relationships between containers, container instances, and tasks. As an example of distribution based on affinity, two container instances may be tagged as "general" and one container instance may be tagged as "database." In a task definition, a task could be specified with a "general" launch constraint providing affinity that the task is to be launched into one (or more) of the container instances tagged as general. As an example of task distribution of anti-affinity, certain container instances may be tagged as "secure-credit-card-processing" and certain other container instances may be tagged as "http-website." Because http-website containers may be serving traffic from untrusted outside entities, it may be desirable not to share such containers with credit card processing tasks. Thus, a task definition can be configured to indicate that "http-website" is anti-affinity to credit card processing tasks to ensure that credit card processing containers are not launched in "http-website" tagged container instances. In this example, the scheduler 208 can be configured to parse any tags in a task definition and use it to filter out container instances that do not meet the criteria associated with the tag. Next, the scheduler 208 can select a container instance from the filtered set to host the container.

Containers may also be configured to utilize other resources provided by the computing resource service provider. For example, each container may be configured with a virtual network interface to allow the container to communicate through the virtual network to other containers and/or other resources of the computing resource service provider. Likewise, security credentials may be assigned on a per-container basis so that containers have their own security credentials to access the other resources provided by the computing resource service provider. Additionally, the container service may be configured to integrate with a load-balancing service to load-balance workloads directed at the containers. For example, a customer may present a list of internet protocol addresses associated with virtual networks of the customer's containers and/or customer instances to a load-balancer of the load-balancing service and instruct the load-balancer to balance workloads between the internet protocol addresses. In addition, the container service may be integrated with an auto-scaling service to allow resources utilized by the containers to be dynamically adjusted as needed.

In some cases, the scheduler 208 may be configured to maximize available resources. For example, a cluster may be utilized primarily for running long-running services, and a need arises for running one or more short-lived batch jobs. In such an example, a scheduler configured to maximize available resources may look for an instance with just enough processing power to support the batch jobs as a best-fit location for the batch jobs. Alternatively, the scheduler 208 may look for an instance utilizing the least of its processing power and schedule the batch jobs with this instance.

In some implementations, a meta-scheduler is configured to run hierarchically on top of one or more schedulers, and the meta-scheduler may decide where to launch the batch jobs. For example, in an implementation there are two types of tasks: short term batch job tasks and long-term services. The two types of tasks may have different placement rules, such as it may be desirable to distribute the service tasks evenly among the available container instances in one or more specified clusters, whereas the batch job tasks may be configured to run in any available container instance with space processing cycles. In some cases, a different scheduler may be assigned to each set of placement rules. However, in cases where such placement rules are competing or in conflict with each other or in cases where an appropriate scheduler must be determined and assigned to a particular task, the meta-scheduler may determine which competing task should prevail, synchronize information between schedulers, or determine the appropriate scheduler for placing a task.

The cluster may be managed through application programming interface calls made to the front-end service 204. For example, a DeleteCluster application programming interface call may delete a specified cluster. An application programming interface call could be made to request a list of what clusters are available and what containers may be running on which clusters. For example, a ListClusters application programming interface call may list all clusters to which a customer has access.

Because containers may be run in any available container instance with sufficient resources in the cluster, containers may be scaled up or down within the cluster as needed, provided enough container instances are available. If the number of container instances in a cluster is insufficient, additional container instances may be created and registered to the cluster through the cluster manager. If an overabundance of container instances exist in the cluster, some container instances may be deregistered from the cluster via the cluster manager. The scheduler 208 may also be configured to start tasks within a task definition file, and determine where to place the tasks within the cluster. For example, the scheduler 208 may determine to distribute tasks evenly between the container instances of the cluster, distribute tasks in some chi-squared distribution, or may distribute tasks among container instances of a cluster according to some other heuristic or set of constraints.

The container service 200 may interact with an authentication system of the computing resource service provider, to authenticate application programming interface calls made to the front-end service 204. In some embodiments, separate security groups and security roles are configured and assigned to different containers on a single host. The container service 200 may also be configured to launch containers and container instances 218 within a virtual private cloud.

In some embodiments, the containers are configured to attach to other services of the computing resource service provider, such as block-level data storage services and/or on-demand data storage services. In some cases, containers may be configured to share attached services with other containers. As an example, a container instance of a customer may be mapped to a block-level storage volume of a block-level storage service of a computing resource service provider, and the containers within the instance may each be configured to be able to read from and/or write to the block-level storage volume. In some examples, the block-level storage volume may be shared between multiple container instances, such as all container instances within a cluster or multiple clusters, such that container instances within the cluster or clusters may all be able to share the block-level storage volume with their running containers. As another example, a container instance may be mapped to 20 different block-level storage volumes, but only two of the block-level storage volumes are specified for the containers.

The template service 206 may be configured to allow the customers 202 to define a task definition for their containers. In some examples, a "task definition" may refer to a script or set of metadata that may define a group of containers; e.g., the number of containers, their types, their components, their relationships to other containers, information describing associated instances, and other metadata. Task definitions may also specify that groups of containers are to be launched in coordination. The template service 206 may receive task definitions from the customers 202, store the task definitions in the database 216, and allow the customers 202 to create, view, update, delete, and otherwise manage their task definitions.

The template service 206 may grant the customers 202 the ability to define a task definition. The template service 206 may allow customers with the ability to provide the task definition by uploading a task definition file or may provide the task definition by allowing customers to select from various options and/or change default settings to dynamically create a task definition file. The template service 206 may allow customers to register a task definition. The template service 206 may also provide an editing interface for editing currently registered task definitions. The template service 206 may register the task definitions at least in part, by providing the task definitions to the container manager backed service 214 to be stored in in the database 216.

In some examples, a "fleet" may refer to a set of computer systems (virtual or physical) running instances, such as the container instances 218 of the present disclosure. A fleet may be subdivided into sub-fleets, and each sub-fleet may be supported by a corresponding container manager back-end service and agent communication service dedicated to that sub-fleet. The agent communication services 220 may be configured to communicate with the agents 222 running on container instances within the sub-fleet.

The container manager backend services 214 may be configured to provide other management services and resources to the sub-fleet on the backend, such as the cluster management software or cluster manager metadata described in the present disclosure. The container manager backend services may be configured to receive task definitions from the template service 206, store the task definitions in the database 216, receive cluster manager metadata from container instances 218 or the agent communication services 220, and provide task definition information and the cluster manager metadata to the scheduler 208 or a customer installed scheduler upon request. The container manager backend services may be configured to provide information about a specified cluster, such as cluster manager metadata.

The agent communication services 220 and container manager backend services 214 may be implemented on separate computer systems within the sub-fleet, separate virtual machine instances within the sub-fleet, may share the same computer systems and/or virtual machine instances within the sub-fleet, or may run on computer systems separate from but in communication with their respective sub-fleet. There may be multiple container instances 218 per sub-fleet. In some cases, each sub-fleet may represent a single cluster. In other cases, clusters may span multiple sub-fleets. In still other cases, each sub-fleet may host more than one cluster. The router service 210 may be configured to route requests from the front-end service 204 to the appropriate sub-fleet. In some embodiments, the router service 210 route requests to a single sub-fleet. In other embodiments, the router service routes requests between multiple sub-fleets.

The container migration service 228 may be a service provided by the computing resource service provider for determining whether to migrate and application executing within a container instance of the container instances 218 to a container instance of the container instances 218 closer in proximity to a target application than the container instance in which the application is currently executing. The determination may be made based on factors, such as an amount of communications (e.g., frequency or volume of traffic) between the application and the target application, or a type of request made by the application to the target application. The container migration service 228 may be similar to the container migration service 512 of FIG. 5.

The denial of service mitigation service 226 may be a service provided by the computing resource service provider for determining a level of threat posed by an application, which has met criteria for being migrated closer in proximity to another application. The denial of service mitigation service 226 may be provided using one or more virtual and/or non-virtual computing systems under the control of the computing resource service provider. The denial of service mitigation service 226 may perform processes, such as the processes 900 and 1100 of FIGS. 9 and 11 respectively, for determining the level of threat and taking appropriate action (e.g., halting a migration, proceeding with the migration, performing a threat/denial of service mitigation action, etc.) based on the level of threat.

The denial of service mitigation service 226 may leverage telemetry data collected by the telemetry service 212 in making its determination of threat level and amount of impact on an application by communications directed to it from other applications. That is, the telemetry data from the telemetry service 212 and/or other data collected by the agent 222 that may factor into the threat level determination may include processor usage (e.g., percentage utilization of a virtual or non-virtual central processing unit, thread starvation, etc.), amount of memory utilization (e.g., real or virtual), network usage (e.g., volume of traffic, network latency, frequency of communication, etc.), request response time (i.e., latency of the application in responding to or fulfilling requests), power consumption by the hardware of the systems hosting the application, and other measurements of the performance ability of the application. For example, if a first application had an average request response time of 20 milliseconds prior to migrating a second application to be closer to the first application, and after migration the average request response time of the first application is 25 milliseconds, it may be indicative of the second application degrading the performance of the first application by 25 percent. Consequently, this information may figure into the threat level determination.

It is contemplated that the telemetry service 212 may be collecting additional metrics not described above, but that may be used in threat level calculations; for example, the denial of service mitigation service 226 factor sudden changes in certain telemetry measurements after a migration into its threat level determination, even if the particular relationship between the migration and the change in telemetry measurements is not yet known. That is, migration of a second application into a same zone as a first application may have consequences that indirectly affect performance of the first application, which may be detectable via other telemetry service 212 metrics. The customer of the computing resource service provider may be provided, such as through a user interface, with the ability to specify which of the telemetry service 212 metrics should factor into threat level determinations and to what degree (e.g., upper thresholds, lower threshold, deviation from the normal range, etc.).

Still another factor in the threat level determination may include the cost of running the application; that is, in an implementation where costs to customers of the computing resource service provider for using services fluctuates based on various factors (e.g., resource usage, time of day, network demand, market demand, etc.), a sudden jump in cost to the customer that appears to coincide with migrating the second application to a same zone as the first application, may indicate that the second application is potentially a threat to the first application. Consequently, in some implementations, cost may be a factor in determining a threat level. It is contemplated in the present disclosure that the term, "processor usage" may refer not only to a percentage (or other measurement) of central processing unit activity but also thread starvation, referring to a situation where legitimate processes are denied access to necessary resources because the processor is too busy to allocate the necessary resources. Thus, depending on implementation, any or all of the factors discussed above (e.g., increase/decrease in processor usage, memory utilization, network usage, etc.) may be considered in the determination of the threat level.

In some embodiments, the threat level may reflect a threat to one or more applications/services that do not necessarily include the application to which communications that triggered a migration process are being directed. That is, a first application may be receiving communications from a denial of service attacker with such frequency that it triggers a migration process of the container migration service 228. However, the actual target of the second application may be a third process that resides in the same zone as the first process. Note that the second application need not necessarily be a denial of service attacker; it may be that the second application is poorly designed (e.g., contains resource leaks, errors in a scheduling or mutual exclusion algorithm, etc.) to present a threat to the third application. Consequently, after the second application is migrated to the same zone as the first application, a reevaluation of the effect of the migration may extend to evaluating performance increases/decreases of other applications within the zone or even other zones. For example, it may be that all applications within a particular zone are configured to share the same Domain Name System (DNS) server instance, and communications (at least initially) directed from a second application to a first application are designed to trigger the container migration service 228 to migrate the second application to the particular zone in order to advance a denial of service attack against the DNS server instance. Thus, determination of a threat level may also factor in metrics (e.g., processor usage, memory usage, network usage, etc.) of shared services of the first application.

Note that the container service 200 and the organization of the components within it are arranged in FIG. 2 for illustrative purposes only. That is, FIG. 2 illustrates only one of numerous possible ways to implement the system of the present disclosure. For example, the agent 222 may provide information regarding the communications between applications to the agent communication service 220, which may store such information in the database 216. In some implementations, the denial of service mitigation service 226 is configured to request its data directly from the database 216. In other implementations, the denial of service mitigation service 226 may obtain its data from the telemetry service 212.

The denial of service mitigation service 226 may be a component of the container service 200, or may be a separate service or component of a separate service provided by the computing resource service provider. In some implementations, the denial of service mitigation service 226 is separate from the container migration service 228 may be integrated with the container migration service 228. The determination 106 of FIG. 1 represents a collection of determinations made by the container migration service 228 and the denial of service mitigation service 226.

In some embodiments, the denial of service mitigation service 226 communicates directly with the agents 222 to obtain tracking metrics and other information regarding communications between applications running in software containers in the container instances 218. In other embodiments, the denial of service mitigation service 226 communicates to the agent communication services 220, which may then relay the communication to the agent 222. In still other embodiments, the denial of service mitigation service 226 communicates placement decisions to the container manager backend services 214, which may relay communicate directly to the agents 222 or to the agent communication services 220.

The telemetry service 212 may be configured to aggregate control group metrics (e.g., information about the processes running within the containers) and container logs and provide the aggregated metrics and logs to a resource monitoring service to allow the customers 202 to monitor resource utilization, such as processor, storage, and network usage, of their respective container instances. Control group metrics include information, such as the amount of memory used by processes of the containers, number of times that a process triggered a page fault, central processing unit usage by the processes of the containers, time during which the central processing units were executing system calls on behalf of processes of the containers, number of reads and writes by the processes of the containers, and number of input/output operations queued for the processes of the containers. In some implementations, the telemetry service 212 may obtain its data directly from one or more agents, such as the agent 222. In other implementations, the telemetry service 212 may obtain its data indirectly from one or more agents, such as through the front-end service 204 or through a connection (not shown) to the database 216.

The container manager backend services 214 may be configured to receive placement requests from the customers 202 for their containers through the front-end service 204, and may ensure that the requested resources are available for the containers. The container manager backend services 214 may then write the desired container state to the database 216. In some implementations, the container manager backend services is responsible for the cluster manager metadata, which may be stored in the database 216, and provided to the scheduler 208 or customer-installed scheduler when requested.

The database 216 may be a data store located within the distributed computing system of the container service 200, or may be a data store of a different service of a computing resource service provider, such as a relational database service. In some embodiments, the database 216 is a set of distributed databases that share a transaction log. The agent communication services 220 may be configured to store the status of the agents 222 and/or other information provided by the agents 222 to the agent communication service 220 in the database 216. In some embodiments, communication by other components of the container service, with containers and the container instances 218 is performed through the agent communication services 220. Each fleet may have at least one agent communication service which relays the messages between the agents 222 of the fleet.

The agents 222 may be software applications configured to run in instances owned by the customers 202 and may track communications (e.g., packets, requests, messages, etc.) between applications running in software containers of the container instances 218 and relay information relating to the communications to the denial of service mitigation service 226. For example, an agent may report that a particular application executing in a software container of the agent's container instance is receiving 1,000 requests per second from a particular Internet protocol address. As another example, an agent may report that certain requests, having a common characteristic in a request header, being made to the application has an effect of causing the application to use a large amount (e.g., above a threshold) of resources (e.g., processor compute power, memory space, network bandwidth, etc.) in order to service the request. This information may allow the denial of service mitigation service 226 to determine whether certain of the communications are suspected as having been received from a malicious entity, such as a botnet, and take corresponding mitigation action. The agents 222 themselves may be running within software containers. The agents 222 may be configured to launch automatically when their respective container instances 218 are instantiated.

The container service 200 may also allow data volumes to be linked to containers. Such data volumes may be designated directories within a container, and may be shared with one or more other containers, that may bypass the default file system of the container instance. In this manner, data may be stored persistently and shared among other containers within the container instance. The data volume may be configured through entries in the task definition file. In some implementations, creation and selection of one or more data volumes for a container can be achieved through a user interface configured for that purpose that communicates to the front-end service 204. The container service 200 may utilize other data storage services, such as on-demand data storage service or block-level data storage of the computing resource service provider.

The container service 200 may be integrated with other services of a computing resource service provider. For example, the container instances may be tagged and/or assigned to an auto-scaling group of an auto-scaling service of the computing resource service provider. In this manner, the auto-scaling service may monitor resource usage by the container instances and may dynamically adjust/allocate resources as needed, such as a sudden increase in resource demand by the container instances. Likewise, the container service 200 may integrate with a load-balancer service of the computing resource service provider. For example, the load-balancer service may distribute traffic to the containers or container instances in order to balance the workload between the container instances.

As an example, a customer may operate a website using container instances 218 assigned to an auto-scaling group. The website may receive requests from multiple users over the Internet, and a load balancer of the load-balancer service may distribute the requests to the container instances 218 according to a load-balancing distribution scheme. The load-balancer service may be a computer system or virtual computer system configured to distribute the requests to the container instances 218 assigned to the load balancer in order to optimize resource utilization and/or avoid overloading any particular host computer. For example, the load balancer may include physical hardware connected to a server rack or otherwise included in a data center. In another example, the load balancer may include one or more virtual machines supported by a host computer. At the same time, the auto-scaling service may detect whether more or fewer resources are needed by the container instances 218 due to the incoming requests, and may allocate more or fewer resources to the container instances 218 as needed.

FIG. 3 illustrates an environment 300 in which an embodiment may be practiced. Specifically, FIG. 3 depicts a hierarchy of zones 304. As noted, a zone may be a logical division of a physical or virtual area in which a software application may be executed. Thus, a zone may be a data center, room within in the data center, a set of server racks within the room, a rack within the set of server racks, a computing device within the rack, a virtual machine instance executing on the computing device, or even a software container executing within the virtual machine instance. All of the types of zones depicted in the environment 300 need not be present in all embodiments. For example, embodiments of the present disclosure need not be configured to migrate software applications from one room in a data center to another room for any of a variety of reasons (e.g., all rooms may be on the same network, performance benefits of migrating applications to the same room in the data center may be outweighed by the cost/effort in migrating the applications). Furthermore, some types of zones may overlap. For example, some server racks within a first room of a data center may share a same network as a server racks in a second room of a data center.

As has been mentioned, as the zones in the hierarchy of zones 304 become more granular, the "closer" the applications become in proximity to each other, potentially improving communication performance between each other. For example, in the hierarchy of zones 304, two applications communicating with each other within the same software container may achieve the optimal communication performance in a particular implementation. Although a software container is depicted as the "closest" (or smallest) type of zone, it is contemplated that even smaller zones may be possible. For example, should a performance benefit be gained, two software applications may be configured to reside in adjacent memory addresses of the same computing device.

Figure 4:
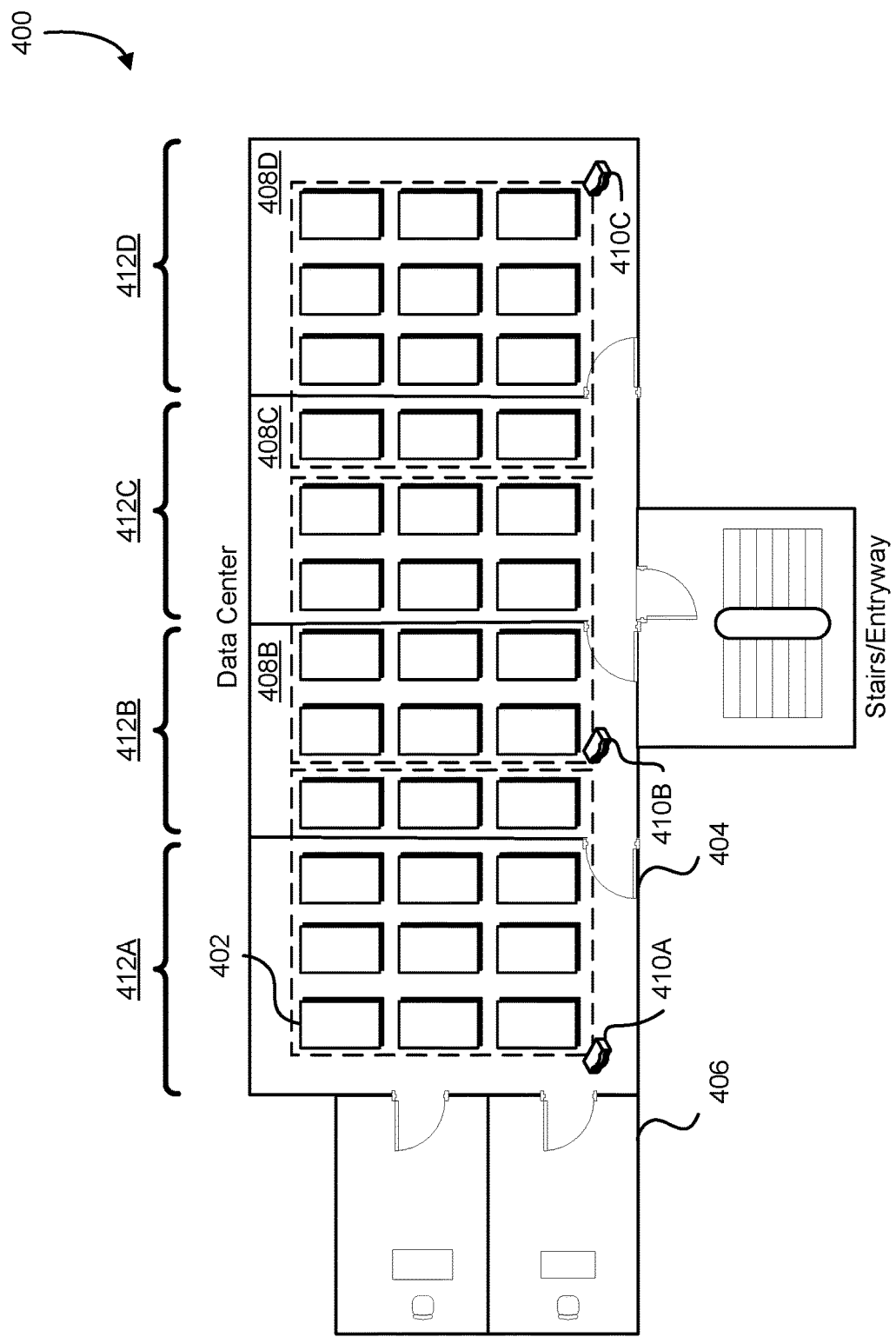
FIG. 4 illustrates an example of a data center in accordance with an embodiment.

FIG. 4 illustrates an aspect of an environment 400 in which various embodiments of the present disclosure may be practiced. As illustrated in FIG. 4, within the environment 400, one or more racks 402 of data servers may be arranged in various configurations and/or rooms 412A-12D within a data center 404. The data center 404 may have multiple rooms 408A-08D for hosting the racks 402. The servers may be further segregated by network; that is, separate networks 410A-10C may be configured for one or more servers in a room, all servers in a room, one or more servers across multiple rooms, or all servers in a rack, and so on. The data center 404 may be maintained by one or more of the computing resource service provider employees. Thus, the data center 404 may have additional offices 406 in order to support various employee tasks, and the data center 404 may span multiple floors. Depending on implementations, any or all of the data center 404, the rooms 412A-412D, the networks 410A-10C, or the racks 402 may be zones, as described in the present disclosure.

In a distributed denial of service attack, a botnet comprising a large number (e.g., 1,000, 10,000, 100,000, etc.) of compromised computing devices may flood a target (e.g., web server, website, Internet protocol address, etc.) with a certain type of traffic. In some cases, the attacks are very sophisticated; for example, the attack may be directed to a login endpoint. In other cases, the attacks may be unsophisticated, and may simply be sending a flood of random packets to the target.

To mitigate a denial of service attack, a system may first recognize certain one or more patterns of the attack. A pattern could include an Internet protocol address known to be a source of an attack or a particular digital signature found in the request (e.g., such as a misspelling in the request that is common between the attackers).

As has been described, a customer of a computing resource service provider providing the resources may be the owner of a first software application being hosted by the computing resource service provider. A second software application, also hosted by the computing resource service provider, owned by the same or different customer may be calling the first software application with such frequency (e.g., above a threshold) that migrating the second software application to be closer in proximity to the first software application (e.g., same software container, same virtual machine instance, same physical host, same server rack) to reduce latency of the requests.

However, in a case where the second software application is a denial of service attacker, migrating the second software application to be closer to the first software application renders the first software application more vulnerable to attack by the second software application. Therefore, the present disclosure contemplates gradations of threat levels, and potential mitigation actions be taken based on the threat level. For example, for a threat level above a first threat level threshold, the second software application of the aforementioned example may simply be blocked, tar-pitted, bandwidth-throttled, or a customer account associated with the second software application may be suspended.

On the other hand, if for a threat level below the first threat level threshold but above a second threat level threshold, the system of the present disclosure may determine that the second software application should not be migrated. However, if the threat level is below the second threat level threshold, but above a third threat level threshold, the second software application may be migrated to a same data center as the first software application, but no closer. Likewise, if the threat level is below the third threat level threshold but above a fourth threat level threshold, the second software application may be migrated to share the same rack as the first software application, but no closer, and so on.

Note that, additionally or alternatively, if the second software application is migrated to be closer to the first software application (e.g., migrated to share the same data center) based on the threat level, the communications of the second software application may be monitored for a period of time, and if it is determined that the threat posed by the second software application to the first software application has not increased, the system of the present disclosure may migrate the second software application to be even closer to the first software application (e.g., the same rack). Moving the software application may continue in hops such as this for so long as the threat level of the second software application does not increase (or does not increase above a predetermined threshold). Note too that, while the threat level is described such that the higher the threat level, the greater likelihood that the second software application is a threat, it is contemplated that in some implementations a low threat level could indicate a high risk.

In some cases, a threat level may be based, at least in part, on a number of requests per second being made to the first software application by the second software application. For example, a threat level threshold for determining to block communications by the second software application may be 1,000 requests per second. On the other hand, a threat level threshold for determining to delay migration of the second software application closer to the first software application may be 100 requests per second. In other words, at 100 requests per second, the frequency of communication appears suspicious but may actually be legitimate.

In some embodiments, where threat level indicates suspicious communication by the second software application, the computing resource service provider sends a notification to the owner of the first software application notifying the owner of the suspicious communication. The computing resource service provider may provide a user interface to the owner for receiving the notification, and the user interface may allow the owner to select a course of action. For example, the owner may select an option indicating that the owner trusts the second software application and for the computing resource service provider to ignore communications between the second software application and the first software application that otherwise would have been deemed suspicious. Alternatively, the owner may indicate a minimum closeness for migrating the second software application toward the first software application; or example, "Migrate the second software application no closer than the same rack as the first software application." Still alternatively, the owner may select to block the suspect communications by the second software application.

In some embodiments, the owner of the first software application can specify the criteria for the various threat level thresholds. Criteria may include other than simply a number of requests per second (e.g., 1,000, 100, 500, etc.). For example, criteria may additionally or alternatively include a type of request (that is, a request received from what appears to be a web browser may have a different set of threat level thresholds/criteria than a request received through programmatic application programming interface call. Likewise, the type of the first software application may affect the threat level thresholds/criteria. For example, if the first software application is a website service, the set of threat level thresholds/criteria may not be the same as if the first software application were a database service.

The computing resource service provider may provide the owner of the first software with the ability to customize severity/threat levels in this manner for the software applications running on his/her computing resources. It is contemplated that the computing resource service provider may provide any of a variety of different ways for a customer to customize security/threat levels, such as via an application programming interface, a graphical user interface or some other user interface, a configuration file (e.g., Extensible Markup Language (XML), JavaScript Object Notation (JSON), or some other file format) uploaded to or downloadable by the denial of service mitigation service, and so on. Using whatever manner is provided by the computing resource service provider, the customer may specify criteria for determining the security/threat levels. For example, the owner may specify that an entity calling the first software application 1,000 times per second is not unusual (i.e., of low threat severity).

Figure 5:
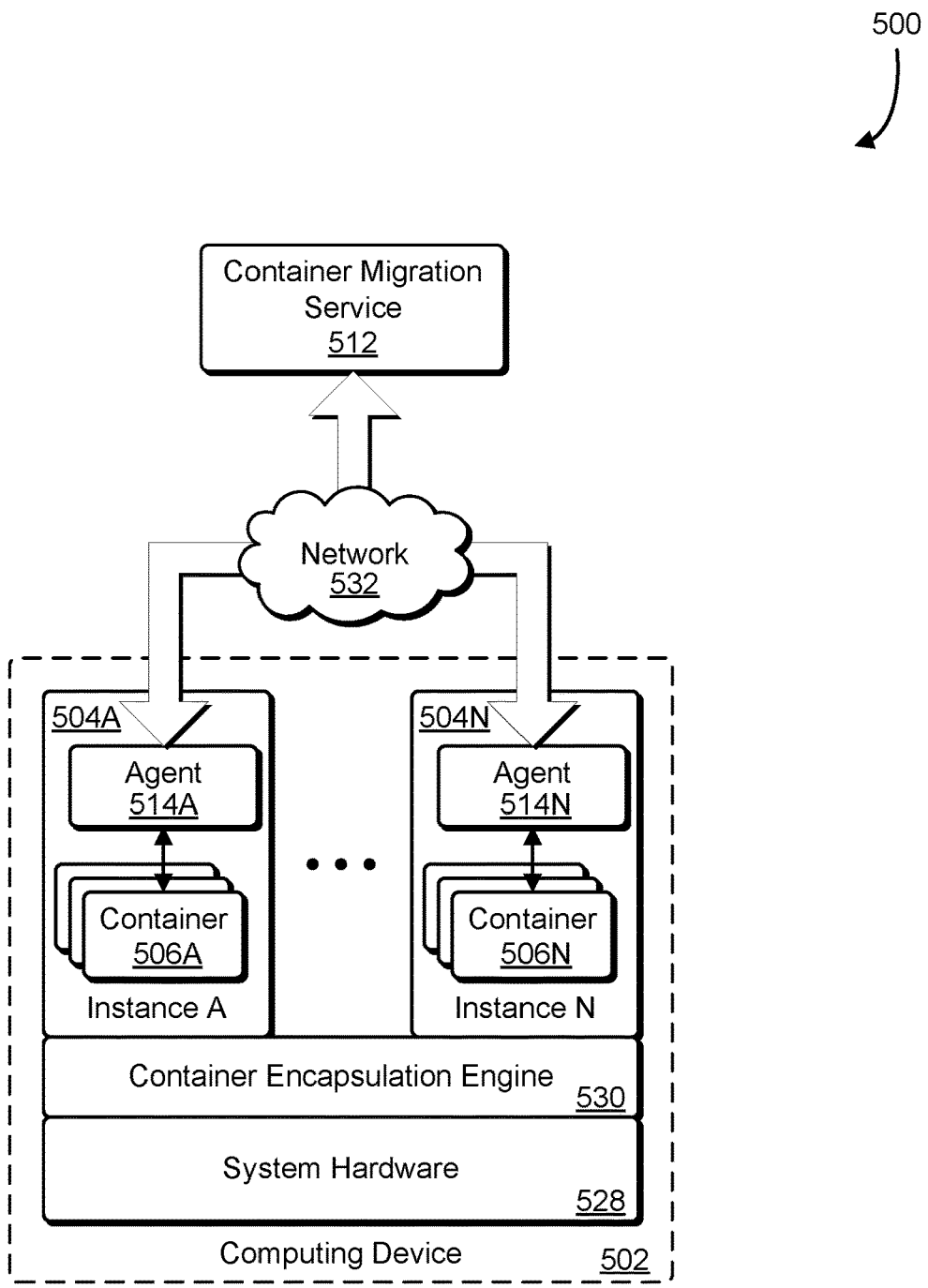
FIG. 5 illustrates an example of a container migration service in accordance with an embodiment.

FIG. 5 illustrates an example embodiment 500 of the present disclosure. Specifically, FIG. 5 depicts a computing device 502 with system hardware 528 running a container encapsulation engine 530 that provides support for running one or more software containers 506A-06N in the container instances 504A-N. Information about the software container 506A-06N, such as communications between the software containers and external entities may be collected by the agents 514A-14N and relayed to a container migration service 512 through a network 532.

The computing device 502 may be a may be a programmable electronic device, comprised of system hardware 528 and software, for storing, retrieving, and processing data. The system hardware 528 may be include memory (e.g., a main random access memory (RAM) for storage of instructions and data during program execution and a read only memory (ROM) in which fixed instructions may be stored) and one or more processors configured to communicate with, and are operatively coupled to, a number of peripheral subsystems via a bus subsystem. These peripheral subsystems may include a storage subsystem, comprising a memory subsystem and a file storage subsystem, one or more user interface input devices, one or more user interface output devices, and at least one network interface controller configured to communicate to external entities through the network 532.

The agents 514A-14N may be embedded as a container wrapper in within its respective software container or implemented as a shim (i.e., an application that transparently intercepts application programming interface calls before redirecting the calls to the target software application) resident within the container instance hosting the software container of the software application. In a cloud based computing environment having software applications that can be migrated in a manner described in the present disclosure, the agents 514A-14N may be utilized to track communications between a software application running in a software container and other entities, and relay information about those communications to the container migration service 512.

The software containers 506A-06N may be software containers configured to execute applications on the behalf of a customer-owner of the container instances 504A-04N. For example, the customer-owner of the container instances 504A-04N may operate a streaming media website, and each of the software containers 506A-06N may host an application for streaming a media file to a particular end user. Consequently, the container instances 504A-04N may all be streaming the same or different media to end-users in parallel in response to requests by the end-users. It may be, however, that some of the applications in the software containers 506A-06N are responsible for receiving requests from end-users, other applications in the software containers 506A-06N are responsible for obtaining the media from a data store in response to the received request, and still other applications in the software containers 506A-06N may be responsible for streaming the obtained media to the requesting end-users. Thus, the container migration service 512 may observe that certain applications (e.g., the software applications responsible for obtaining the media and the software applications responsible for streaming the obtained media), because of the frequency or volume of communication between the applications, may benefit from migrating the applications to share a same zone (e.g., same physical host, same container instance, same software container, etc.).

The container instances 504A-04N may be virtual machine instances configured to launch and execute software containers, such as the software containers 506A-06N. As used in the present disclosure, the term "virtual machine" may refer to an emulation, in software and/or hardware of a physical computer system, such that software executing in the virtual machine environment behaves as if the virtual machine were a physical computer.

The container encapsulation engine 530 may be a software application executing on the system hardware 528 and configured to allow one or more software containers, such as the software containers 506A-06N, to execute within the container instances 504A-04N. Examples of container encapsulation systems include the Docker container engine, the Parallels Virtuozzo container engine, and the Solaris container engine. The network 532 may represent the path of communication between an entity and computing devices of the computer resource service provider. Examples of the network 532 include the Internet, a local area network, a wide area network and Wi-Fi.

As noted, the computing resource service provider providing the resources and services for hosting the software applications in the container instances 504A-04N may provide the customer/owner of the software applications with an interface for specifying criteria for determining levels of threats based on communications between external entities and the software application and what actions to take based on a threat level. For example, the customer/owner may specify a frequency of communication between the software application and another application that has been migrated to run in the same software container as the software application. In other words, upon the occasion where a second software application is migrated to run in the same container as a first software application, if communications between the first and second software applications exceeds, or otherwise reaches a predetermined value relative to, a frequency of communication specified by the customer/owner for determining whether the first software application is being attacked, the second software application may be migrated out of the software container and/or blocked, depending on the determined threat level.

Additionally or alternatively, a customer/owner may specify certain behaviors deemed suspicious (e.g., frequency of communications, types of requests, digital fingerprints, amount of processor and/or memory usage, any of the factors discussed above in the description of FIG. 2, etc.), and, as a result, software applications exhibiting such specified behaviors may be prevented by the container migration service 512 from being migrated closer to the first software application. Note that an amount of processor and/or memory usage may refer to an amount of processor and/or memory usage by the first software application as it attempts to service requests made by the second software application, and may alternatively or additionally refer to processor and/or memory usage made by the second software application as it makes the requests, which may be measured by the computing resource service provider hosting both the first software application and the second software application.

In some implementations, the thresholds and other criteria for determining threats can be specified by a customer/owner during the course of the customer/owner in setting up his/her software containers (such as specifying the thresholds and other criteria in a task definition file for the software containers). Additionally or alternatively, the customer/owner may specify the threshold and criteria at a time after the software containers have been set up. For example, the customer/owner may set up and cause applications in his/her software containers to be launched, and the computing resource service provider may have a set of default thresholds. If communication or resource usage exceeds, or otherwise reaches a predetermined value relative to, certain of the default thresholds, the computing resource service provider may notify the customer/owner and inquire whether the customer/owner would like to update threshold and/or other criteria for determining threats to the software applications. In this manner, the customer/owner may be given a chance to dynamically update thresholds and other criteria for determining levels of threat rather than having a single set of thresholds and other criteria for all containers and all of the customer/owner's instances.

Depending on the determined threat level presented by a second software application to a first software application, actions to mitigate the threat may include preventing the second software application from being migrated closer in proximity to the first software application, temporarily (for a predetermined amount of time, until the threat presented by the second software application decreases, or some other criteria is fulfilled) or indefinitely, or migrating the second software application to be farther in proximity from the first software application (e.g., out of a zone shared with the first software application). Other mitigation actions that may be performed based on the threat level include dropping the received data (i.e., ignoring the received packet or message), rejecting the received data (i.e., ignoring the received packet or message, and providing an error message to the source internet protocol address of the requestor), rate limiting the source internet protocol address of the requestor, tar-pitting the source internet protocol address (i.e., delaying future incoming packets from the source internet protocol address of the requestor). Mitigation actions may additionally include logging information including, but not limited to, the source internet protocol of the received packet or message, and/or network statistics (e.g., roundtrip times, retransmits, etc.) corresponding to the received packet or message.

Still another mitigation action that may be performed may be to move either or both the first software application or the second software application to a container instance that is running on a host that has more computing resources than currently provided by the host or hosts upon which the first software application and the second software application are running. In this manner, if the threat presented by the second software application is deemed low enough, but the second software application has potential to negatively affect the performance of the first software application in a significant manner (e.g., above a threshold performance impact), migrating one or both of the software applications to a host with greater resources may minimize or negate the adverse performance impact. Note that in some implementations, the system of the present disclosure, rather than itself performing the mitigation action, initiates a process for performing a mitigation described above by one or more other systems. For example, in an implementation, a mitigation action is initiated by sending a message to another computing device to perform the mitigation action.

Note that while the present disclosure describes migrating software applications running in software containers, it is contemplated that many of the embodiments described are applicable to other software paradigms beside software containers, such as virtual machines. For example, the zones 104 A-04B of FIG. 1 may represent virtual machine instances, and the applications 102A-02B may be running within the virtual machine instances, but not in software containers. That is, the first software application 102A may be moved to execute within the same virtual machine as the second software application 102B. However, an advantage presented by the present disclosure is to implement gradated threat levels in a dynamically-organized, cloud environment as described herein, whereby software applications may be dynamically migrated in order to minimize latency between applications that frequently communicate with each other.

In some embodiments, the denial of service mitigation service described in the present disclosure logs information collected by agents executing in container instances about communications between two software applications, as well as log information about the two software applications by virtue of the two software applications being managed by the same computing resource service provider. With recourse to this log information, the denial of service mitigation service may determine digital signatures of likely denial of service attacks and attackers. Because communications in the environments described in the present disclosure generally occur within networks of the same computing resource service provider, the computing resource service provider has more visibility to the attacks and the attacker than if the attacker were located in a network outside the control of the computing resource service provider.

Consequently, if the denial of service mitigation service determines that communications from a second software application are almost certainly an attack (e.g., above a specified high risk threat level threshold, matching a digital fingerprint of known attack or attacker, etc.) against the first software application, components of the infrastructure of the computing resource service provider (e.g., virtual computing system service, authentication service, policy management service, etc.) can monitor its infrastructure to prevent future attacks. For example, if the second software application is determined to be a denial of service attacker, the computing resource service provider may take action to block the second software application from being copied or installed, prevent existing copies of the second software application from being executed or accessed, and/or block communications originating from currently-running instances of the second software application. Thus, by determining a digital fingerprint of a denial of service attack by the second software application against the first software application, the denial of service mitigation service may prevent a similar attack in real-time against a third software application before the attack is even begun.

Digital fingerprint can include various characteristics common to requests/messages sent by the attacker, which are not typically present in requests/messages sent by legitimate (non-malicious) entities. For example, an attack by the second software application may be determined to have a typographical error in the user-agent header, once this typographical error in the user-agent header is determined to be the digital fingerprint of the particular attack, the denial of service mitigation service may monitor for other communications having the same typographical error in the user-agent header and block such communications.

The container migration service 512 may be a service similar to the container migration service 228 of FIG. 2, provided by a computing resource service provider that provides resources, such as the computing device 502, and/or services, such as the container instances 504A-04N to its customers. The container migration service 512 may be configured to determine whether, based on factors such as frequency of communication, one or more applications may benefit (e.g., experience a reduction of latency) from being migrated to share the same zone in a manner described in the present disclosure.

Figure 6:
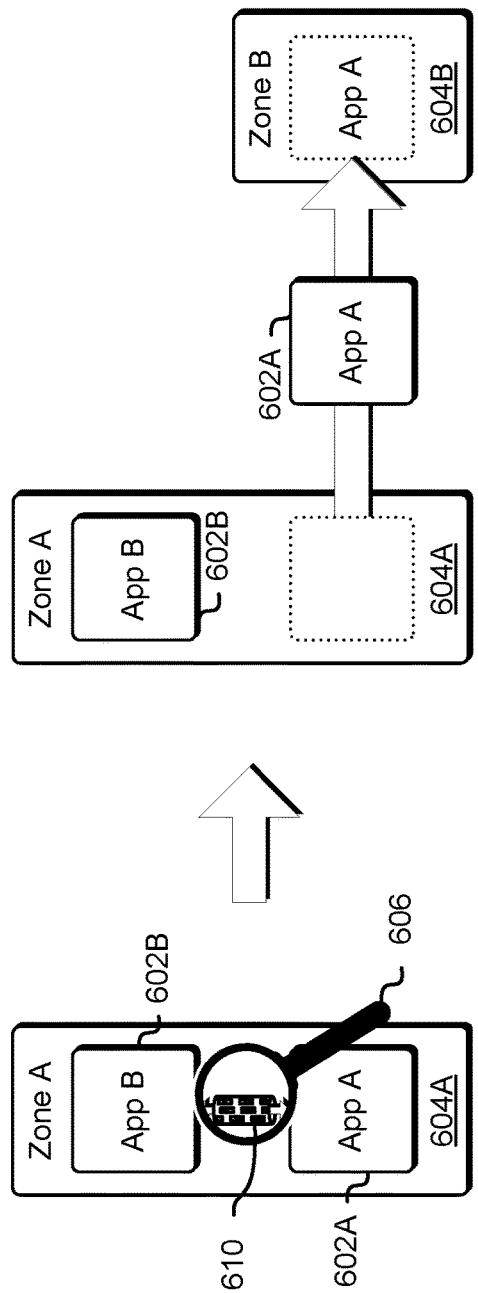
FIG. 6 illustrates an example of reverse migration in accordance with an embodiment.

FIG. 6 illustrates an example embodiment 600 of the present disclosure. Specifically, FIG. 6 depicts an embodiment where a determination 606 is made, based on communications 610 directed from a first software application 602A to a second software application 602B and/or other factors, such as those discussed in conjunction with FIG. 2 (e.g., processor usage, memory utilization, etc.), that the first software application 602A being in the same zone (i.e., a first zone 604A) presents an unacceptable threat (e.g., the determination 606 yields a threat level above a particular threshold) to the second software application 602B, and an action is taken to mitigate the threat posed by the first software application 602A. The mitigation action specifically depicted in the example embodiment 600 is to migrate the first software application 602A to a separate zone (i.e., a second zone 604B, different than the first zone 604A); however, it is contemplated that other mitigation actions may be performed alternatively or additionally.

The example embodiment 600 depicts a situation where the first software application 602A is sharing the same zone, the first zone 604A, as the second software application 602B. The first zone 604A may, as described earlier, be a data center, virtual machine instance, physical machine, network, type of server (e.g., web server, database server, application server, etc.), or some other logical grouping. In some implementations, the zones are definable and customizable by customers of the computing resource service provider providing resources for the application 602A-02B. For example, a customer may specify that a particular Internet protocol address range corresponds to a particular zone, and a different Internet protocol address range corresponds to a different zone.

As another example, a customer may assign a tag to a group of virtual machine instances, naming them "web server group 1," and assign another tag to a different group of virtual machine instances, naming them "web server group 2." In some examples, a "tag" may refer to a label associated with one or more instances for the purpose of designating instances with a common characteristic by which the instances can be filtered or grouped. The customer may specify that these tags correspond to different zones (e.g., zones 604A-04B). Note that tags may overlap; for example, an instance may be tagged both as a "web server" and as a "data server." In such a case, if the second software application 602B is running in a container instance tagged as a data server, and if the first software application 602A is running in a different container instance that is tagged as both "web server" and "data server," the first software application 602A and the second software application 602B may be said to share the same data server zone. In such a scenario, the example embodiment 600 may illustrate migrating the first software application 602A to a zone that is not tagged "data server."

As noted, the example embodiment 600 depicts a scenario where it is determined to migrate the first software application 602A to a zone not shared by the second software application 602B (i.e., the second zone 604B). A cause for this determination 606 may be that a denial of service mitigation service of the present disclosure determined that the communications from the first software application 602A directed to the second software application 602B are suspicious (e.g., are of a rate that exceeds a specified threshold), and it is determined to reduce the risk to the stability of the second software application 602B by migrating the first software application 602A to a different zone that increases the latency of the communications 610. Increasing the latency of the communications 610 may have the effect of reducing negative impact upon communications by legitimate applications due to a denial of service attack upon the second software application 602B. In some cases, if the threat level presented by the first software application 602A is not high enough to determine to block the first software application 602A, but high enough to determine that the first software application 602A is likely a denial of service attacker, the second zone 604B may represent a quarantine zone, such as the quarantine zone 108 of FIG. 1.

The software applications 602A-02B may be executable applications or scripts being executed on a computing device hosted by computing resource service provider. Example applications include applications for streaming media, applications for receiving and responding to website requests, applications for rendering graphics, applications for processing credit card information, an authentication service application, a database service application, a policy management application, and other data processing applications. These examples reflect typical legitimate software applications. However, the first software application 602A shown in FIG. 6 may be a denial of service attacker, such as an infected application, virus, or botnet application. The first software application 602A may alternatively be an application with a security flaw or programming error that causes it to be a threat to the second software application 602B.

The determination 606 may be a determination whether to migrate the first software application 602A made by a denial of service mitigation service similar to the denial of service mitigation service 226 of FIG. 2.

Figure 7:
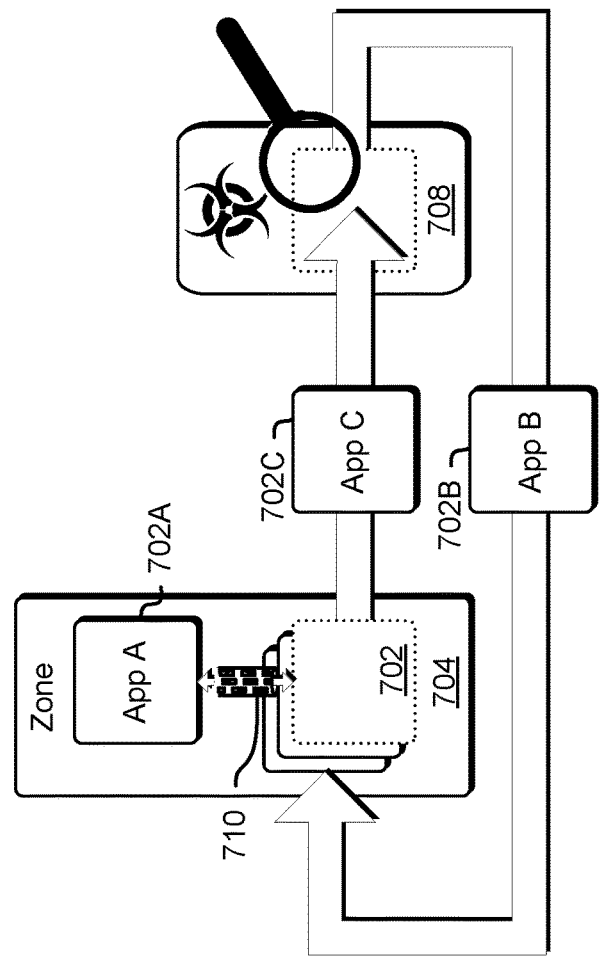
FIG. 7 illustrates an example of identifying a threatening application in accordance with an embodiment.

FIG. 7 illustrates an example embodiment 700 of the present disclosure/etc. Specifically, FIG. 7 depicts an embodiment where communications 710 (or other criteria, such as processor usage, memory utilization, or other factors as described herein) suggests that at least one application of a plurality of software applications 702 is a denial of service attacker or presents some other threat to the security or stability of a first software application 702A. That is, in some implementations it may be difficult to determine which applications of a plurality of software applications is an attacker as long as the software applications reside in the same zone (i.e., zone 704) as the application under attack, the first software application 702A. Thus, in the example embodiment 700, software applications of the plurality of software applications 702 may be migrated at least temporarily from the zone 704 to a separate zone, such as quarantine zone 708, for observation. If it is determined that the software application migrated from the zones 704 does not pose a significant threat (e.g., a determined threat level of the application under observation does not rise above a certain threshold), the software application may be migrated back to the zone 704 and another software application may be migrated to the other zone for observation. The example embodiment 700 depicts just such activity, showing a second software application 702B being returned to the zone 704 shared with the first software application 702A and a third software application 702C being migrated from the zones 704 into the quarantine zone 708 for observation.

The first software application 702A may be any software application executing in the zone 704, such as any of the software applications described in conjunction with applications 602A-02B of FIG. 6. The software applications 702B-02C of the plurality of software applications 702 may each be a legitimate application or malicious application (e.g., denial of service attackers). As noted, the zone 704 may be a logical division of a physical or virtual area in which a software application may be executed, such as a group of virtual machine instances, a data center, or software container. The quarantine zone 708 may be a zone configured to temporarily or indefinitely host one or more applications that may present a threat above a certain threshold to one or more other applications. The communications 710 represents communications, such as requests, responses, messages, and packets, sent between the software applications 702 and the first software application 702A.

In some implementations, it may be difficult to determine ahead of time how migrating one or more applications to be closer in proximity to another application will affect the performance of that other application. Likewise, when multiple applications have been migrated to be closer in proximity to the other application, and the other application's performance subsequently degrades below an acceptable threshold, it initially may be unclear as to which of the multiple applications is causing the worst degradation in performance (i.e., which one or ones are causing problems for the target application). That is, while in some cases it may be readily determined which software containers hosting the applications are consuming the most processor usage or are producing the most network traffic, in other cases, an application performing a denial of service attack at the application layer (e.g., sending a specific type of packet that causes problems for the target application/service to process it), it may be difficult to distinguish the troublesome application from other applications without segregating the applications.

The example embodiment 700 presents a possible solution. The quarantine zone 708 may be an isolated environment, such as a software container running on a different physical host from the first software application 702A. The quarantine zone 708 may be a zone similar to the quarantine zone 108 of FIG. 1. Applications of the plurality of software applications 702 may be migrated from the zones 704 to the quarantine zone 708, whereupon the migrated software applications may be closely monitored to determine if they are causing a problem for the first software application 702A. If, after a period of monitoring, the migrated software applications are determined not to be causing the problem for the first software application 702A, the migrated software applications may be re-migrated into the zone 704. This process may be repeated until the troublesome application or applications are identified.

One alternative to the embodiment 700 may be that, prior to the plurality of software applications 702 being migrated to the zone 704 in the first place, each of the plurality of software applications 702 may first be migrated to the quarantine zone 708, and after a period of monitoring whereby the migrated software application is determined not to pose a threat (e.g., threat level above a threshold) to the first software application 702A, the migrated software application then may be further migrated into the zone 704 of the first software application 702A. It is contemplated that, in this embodiment, and the example embodiment 700, software applications can be migrated to the quarantine zone 708 singly or in multiples. It is also contemplated that the quarantine zone 708 may be one or more quarantine zones.

Figure 8:
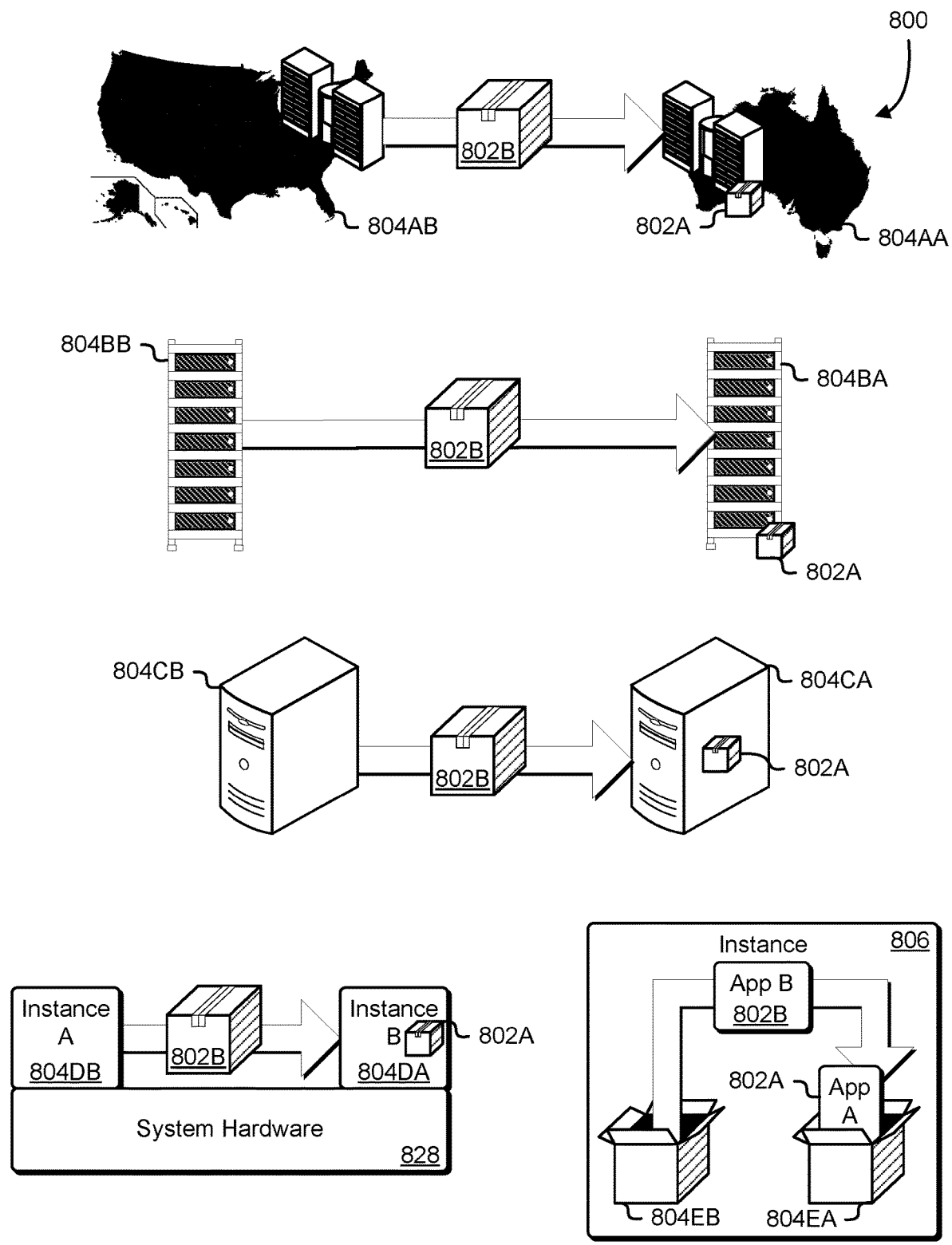
FIG. 8 illustrates an example of migrating an application to a different zone in accordance with an embodiment.

FIG. 8 illustrates various examples 800 of migrating applications to zones in embodiments of the present disclosure. For example, in a first scenario, a first software application 802A is executing in a first zone, a first data center 804AA, and a second software application 802B is migrated from a second zone, a second data center 804AB, to the first data center 804AA. In a second scenario, the first software application 802A is executing on a server in a first zone, a first server rack 804BA, and the second software application 802B is migrated from a second zone, a second server rack 804BB, to the first server rack 804BA.

In a third scenario, the first software application 802A is executing in a first zone, the first server 804CA, and the second software application 802B is migrated from a second zone, a second server 804CB to the first server 804CA. In a fourth scenario, the first software application 802A is executing in a first zone, the first container instance 804DB, and the second software application 802B is migrated from a second zone, a second container instance 804DB, to the first container instance 804DA. Lastly, in a fifth scenario, both the first software application 802A and the second software application 802B are executing in containers 804EB-04EA within a same container instance 806, and the second software application 802B is migrated from a second zone, a second software container 804EB, to a first zone, a first software container shared 804EA, shared with the first software application 802A.

Figure 9:
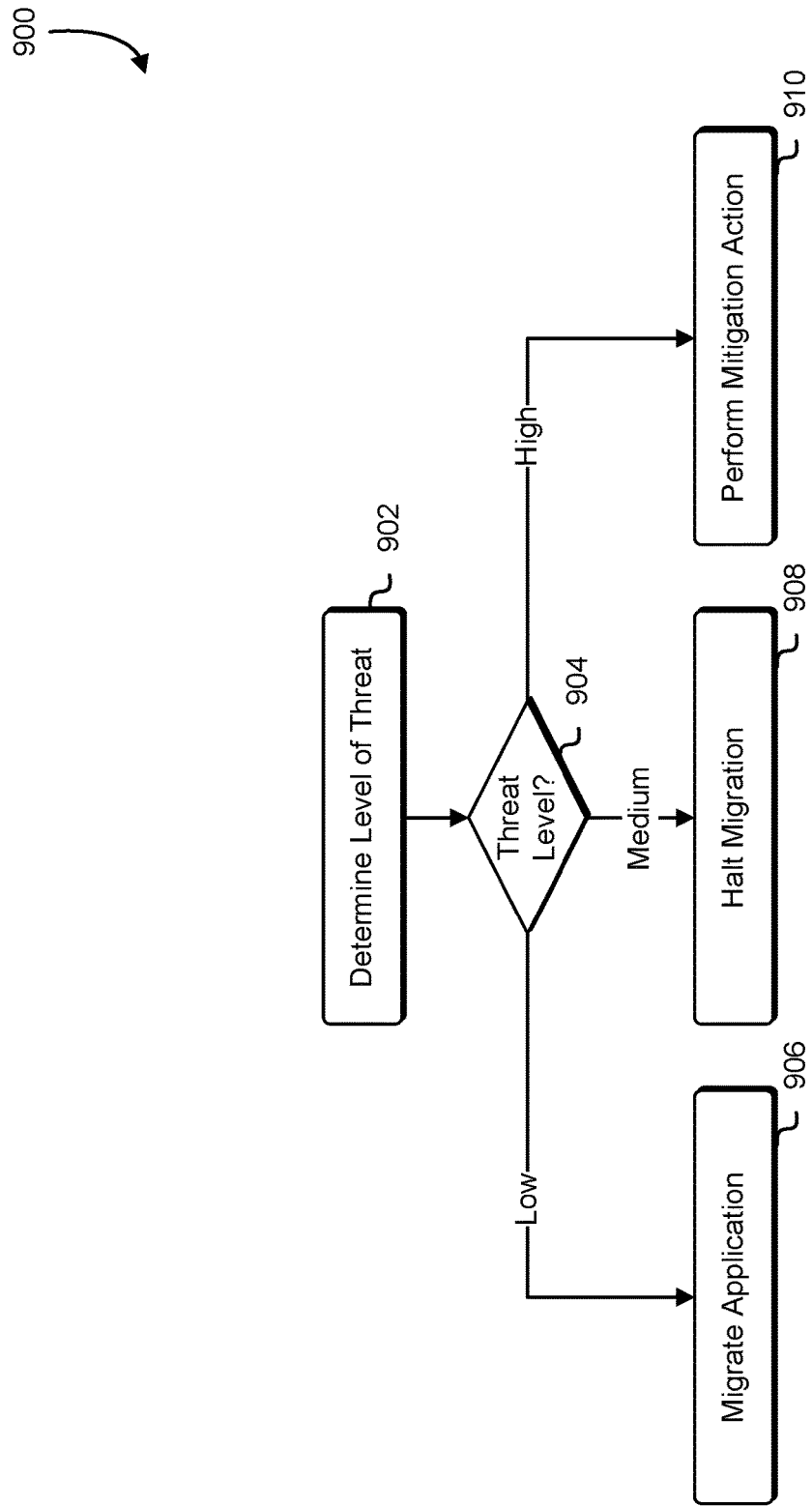
FIG. 9 is a flowchart that illustrates an example of performing different actions based on threat level in accordance with an embodiment.

FIG. 9 is a flowchart illustrating an example of a process 900 for computing a threat level and performing an action based on the threat level in accordance with various embodiments. Some or all of the process 900 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 12:
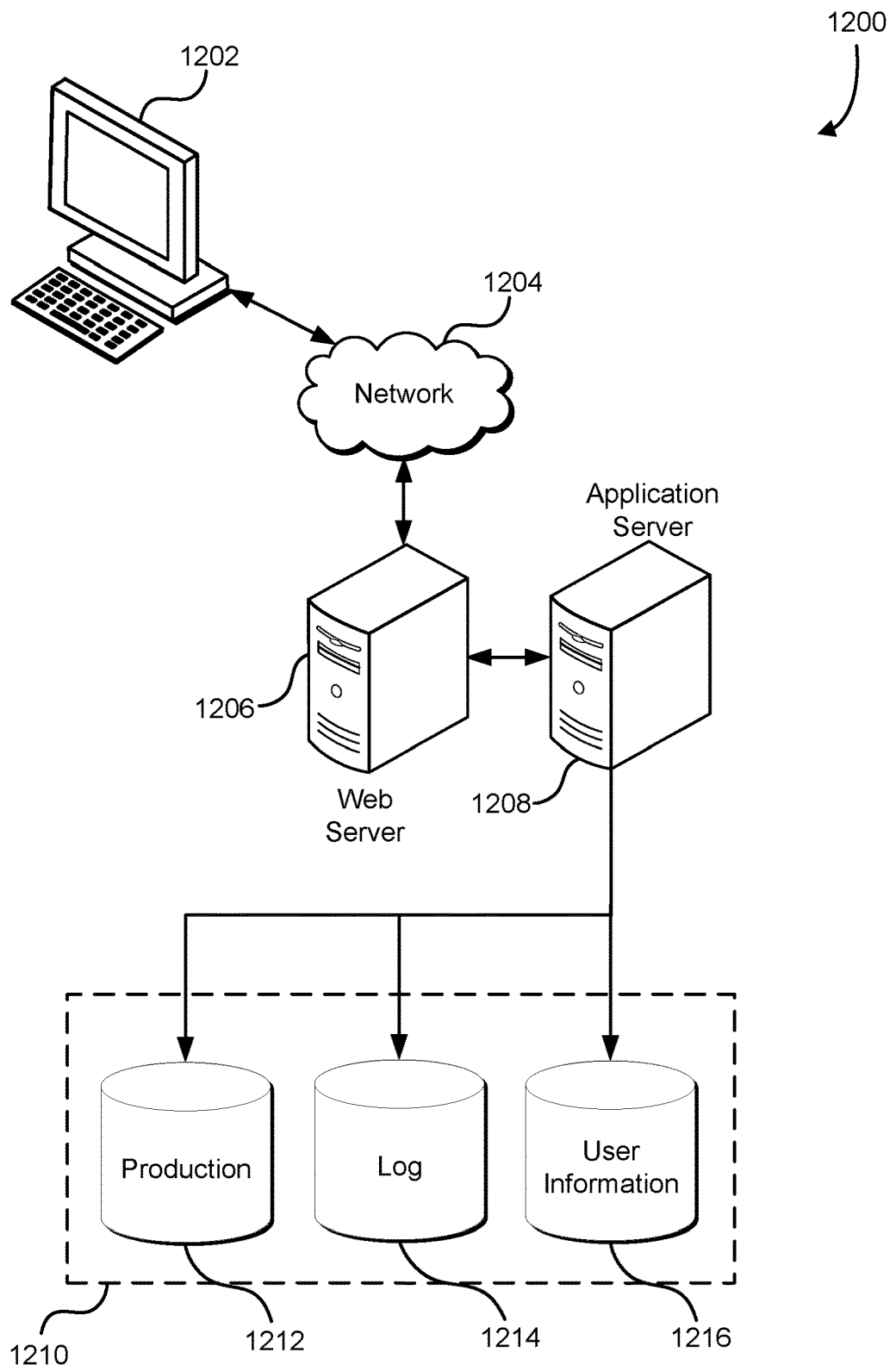
FIG. 12 illustrates an environment in which various embodiments can be implemented.

For example, some or all of process 900 may be performed by any suitable system, such as a server in a data center, by various components of the environment 1200 described in conjunction with FIG. 12, such as the web server 1206 or the application server 1208, by multiple computing devices in a distributed system of a computing resource service provider, or by any electronic client device, such as the electronic client device 1202. The process 900 may be initiated when it is determined to potentially migrate an application to share a zone with another application. Note that the zone may already be shared by multiple applications, and in some implementations, the process 900 can be performed for each of the multiple applications in the zone. It may be determined to potentially migrate the application for various reasons, including to reduce latency of communication between the application and another application in the zone.

However, the process 900 may be performed prior to migrating the application in order to determine whether the application could present a threat to another application in the zone. Therefore, in 902, a level of threat presented by the application in question to another application may be determined. The threat level may be a value that is calculated based on various factors, such as amounts (e.g., frequency, volume, etc.) of network traffic produced by the application, average or peak resource (e.g., processor, memory, etc.) usage by the application, a digital fingerprint of the application or of communications by the application matching a previously-observed digital fingerprint suspected to be associated with a denial of service attack or other security risk, etc.

The threat level may be computed differently based on a type of target application (e.g., threat level for a database service may be computed differently than a threat level for an authentication service, due to the nature and frequency of requests made to such services), a type of requesting application, a target zone (e.g., threats to an entire data center zone may be considered more or less serious than a threat to a particular virtual machine instances zone), a source zone (e.g., applications residing in a zone having less-stringent antivirus protections may be deemed higher threats than applications residing in zones having more-stringent antivirus protections), etc. The threat level may indicate a likelihood of the application being a threat to the performance or stability of another application. For example, a computer threat level of 50.1 may represent an estimate that an application is 50.1% likely to be a denial of service attacker.

In 904, a determination is made based on the threat level. The determination may be made based on predetermined thresholds set by a computing resource service provider hosting the system performing the process 900, or may be set by a customer of the computing resource service provider (e.g., through a web or programmatic interface) specifically for applications running on virtual machine instances associated with the customer. Note that although only three levels of threat are depicted in FIG. 9, it is contemplated that there may be any number of gradations of threat and actions that may be performed as a result.

In the event that the threat level is low, in 906, the action taken may be to migrate the application to the target zone shared with the target application. As noted, a zone may be very inclusive (e.g., a data center) or may be very exclusive (e.g., the same software container).

However, if the threat level indicates a medium threat (that is, the computed threat level may indicate that the application being migrated may present some security risk, but it is still uncertain whether the application actually does present a threat to the target application), in 908, an action to take may be to halt migration of the application. Halting migration of the application may be any of a variety of things, such as postponing migration of the application for a predetermined amount of time, setting a rule forbidding the application to be migrated to the target zone, requiring a customer-owner of the target application to confirm whether the migration of the application should be performed or not, etc. It is noted that the process 900 may be performed by a same or different process or service from the migration service, and halting migration may involve causing the migration service to exit from a process of migrating the application in question.

Likewise, if the threat level is determined to be high (e.g., a digital fingerprint of the application in question or communications by the application in question matches a digital fingerprint confirmed to be associated with a denial of service attack, the threat level is above a threshold likelihood of being a denial of service attack, etc.), the system performing the process 900 may cause a denial of service mitigation action to be performed 910. For example, the application in question may be blocked, may be deleted from instances where it is stored, communications by the application may be throttled, the application may be tar-pitted, and so on. In some implementations, the higher the threat level, the more drastic the mitigation action that may be performed. In some implementations, less-drastic mitigation actions (e.g., throttling) are be implemented for lower-level threats as well (such as in the operations of 908). Note that one or more of the operations performed in 902-10 may be performed in various orders and combinations, including in parallel. For example, for a plurality of applications being migrated, the process 900 may be performed in parallel for each of the plurality of applications.

Figure 10:
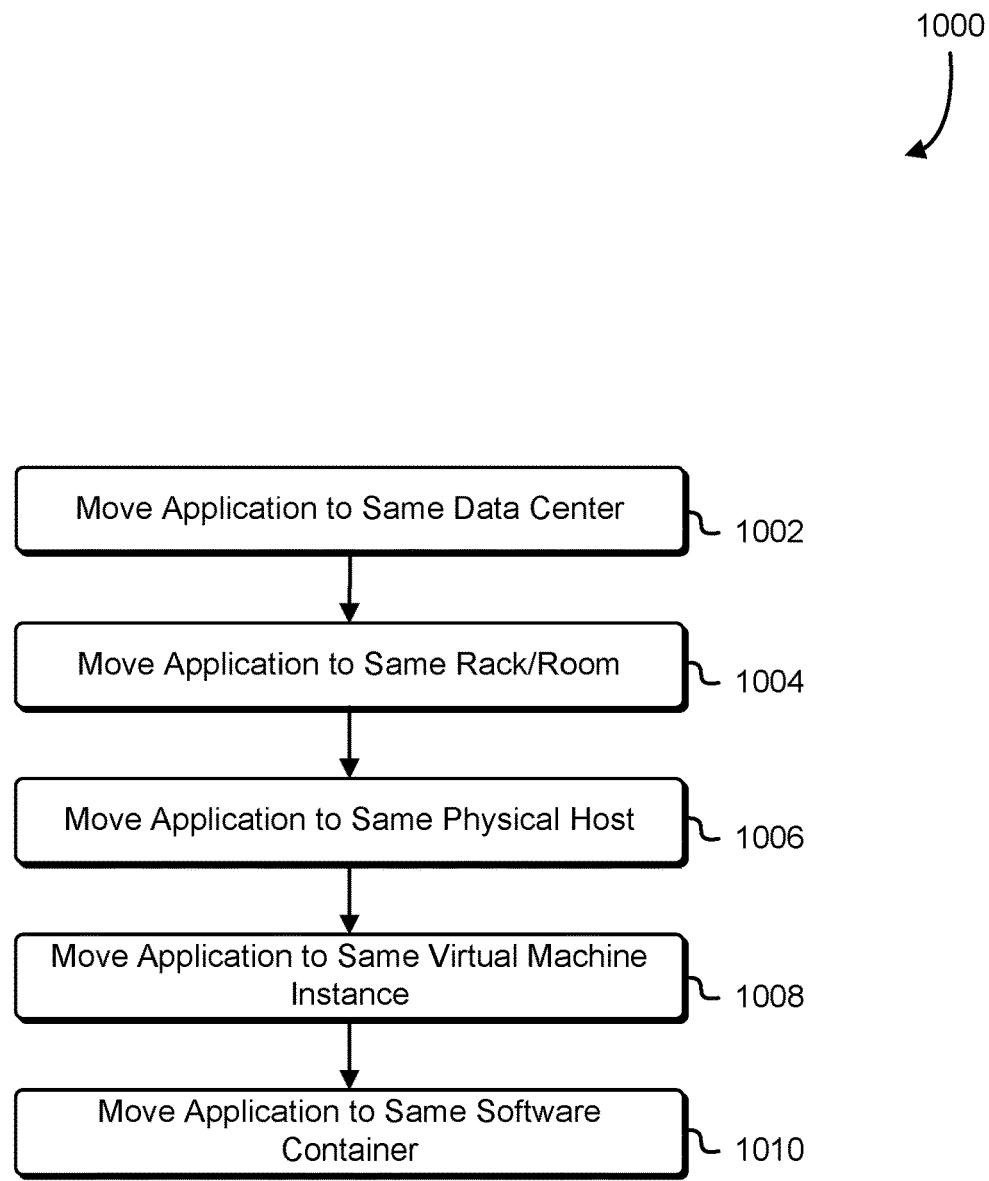
FIG. 10 is a block diagram that illustrates an example of zone hierarchy in accordance with an embodiment.

FIG. 10 is a flowchart illustrating an example of a process 1000 for migrating an application in steps in accordance with various embodiments. Some or all of the process 1000 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1000 may be performed by any suitable system, such as a server in a data center, by various components of the environment 1200 described in conjunction with FIG. 12, such as the web server 1206 or the application server 1208, by multiple computing devices in a distributed system of a computing resource service provider, or by any electronic client device, such as the electronic client device 1202. The process 1000 includes a series of operations wherein an application is migrated to be closer in proximity to a target application, with each step migrating the application to a more exclusive zone than the previous zone.

For example, in 1002, the system performing the process 1000 may determine (such as, based on a frequency of communication between an application and the target application) to migrate the application from a different data center to a same data center as the target application. The system may monitor the application for a period to determine whether performance of the target application and/or other applications within the same data center have been negatively impacted above a threshold as a result of the migration, and if not, the process 1000 may continue. In some cases if the performance of the target application and/or other applications within the same data center has been negatively impacted above the threshold as a result of the migration, the system may migrate the application out of the same data center or take some other action to mitigate the negative impact.

In 1004, the system performing the process 1000 may again determine to migrate the application closer to the target application, such as to a same server rack or same room in the data center as the target application resides. Similar to the operations of 1002, the system may monitor the application for a period to determine whether performance of the target application and/or other applications within the same server rack or same room in the data center have been negatively impacted above a threshold as the result of the migration, and if so, take action to mitigate the negative impact accordingly. If not, in 1006, the system performing the process 1000 may once again determine to migrate the application closer to the target application, such as to the same physical host (i.e., computing device hardware) as the target application resides. Again, the system may monitor the application for a period to determine whether performance of the target application and/or other applications within the same physical host have been negatively impacted above a threshold as a result of the migration. If so, the system may take appropriate action (e.g., migrating the application up to a more inclusive zone, performing some other mitigation action, etc.) to mitigate the negative impact.

If not, in 1008, the system performing the process 1000 may determine again to migrate the application closer to the target application, such as to a same virtual machine instance as the target application resides. The system may monitor the application for a period to determine whether performance of the target application and/or other applications within the same virtual machine instance are negatively impacted above a threshold, and if so, may take appropriate action as described in the present disclosure to mitigate the negative impact. Otherwise, the system performing the process 1000, in 1010, may still again determine to migrate the application closer to the target application, such as to the same software container as the target application resides. The system may monitor the application to determine whether performance of the target application and/or other applications running within the same software container are negatively impacted above a threshold, and if so, may take appropriate action to mitigate the negative impact. Otherwise, in the embodiment depicted by the process 1000, the system need go no further.

Note that the zones depicted (data center, rack/room, physical host, virtual machine instance, and software container) in FIG. 10 are illustrative only, and vary by implementation. Actual zones in an implementation may include all, some, different zones of the zones depicted in FIG. 10, and, as previously noted, zones may overlap (e.g., data center rooms and networks both may be zones, even though a network can includes servers from different rooms of a data center, as illustrated in FIG. 4) and/or include groups of locations/destinations (e.g., virtual machine instances A-D may be a first zone, virtual machine instances E-H may be a second zone, etc.).

Furthermore, zone migration need not pass through all steps 1002-10. That is, steps may be skipped; for example, an application may be moved to a same data center in 1002 as the target application, and upon determination that the application poses little risk to the target application, the next migration may migrate the application to the same software container in 1010, thereby skipping the operations of 1004-08. Likewise, it is not necessary to start with the operations of 1002. In other words, the application may be moved to the same physical host as the target application in 1006 without ever having performed operations of 1002-04. Also, in a case where multiple applications are being migrated, one or more of the operations performed in 1002-10 may be performed in various orders and combinations, including in parallel.

Figure 11:
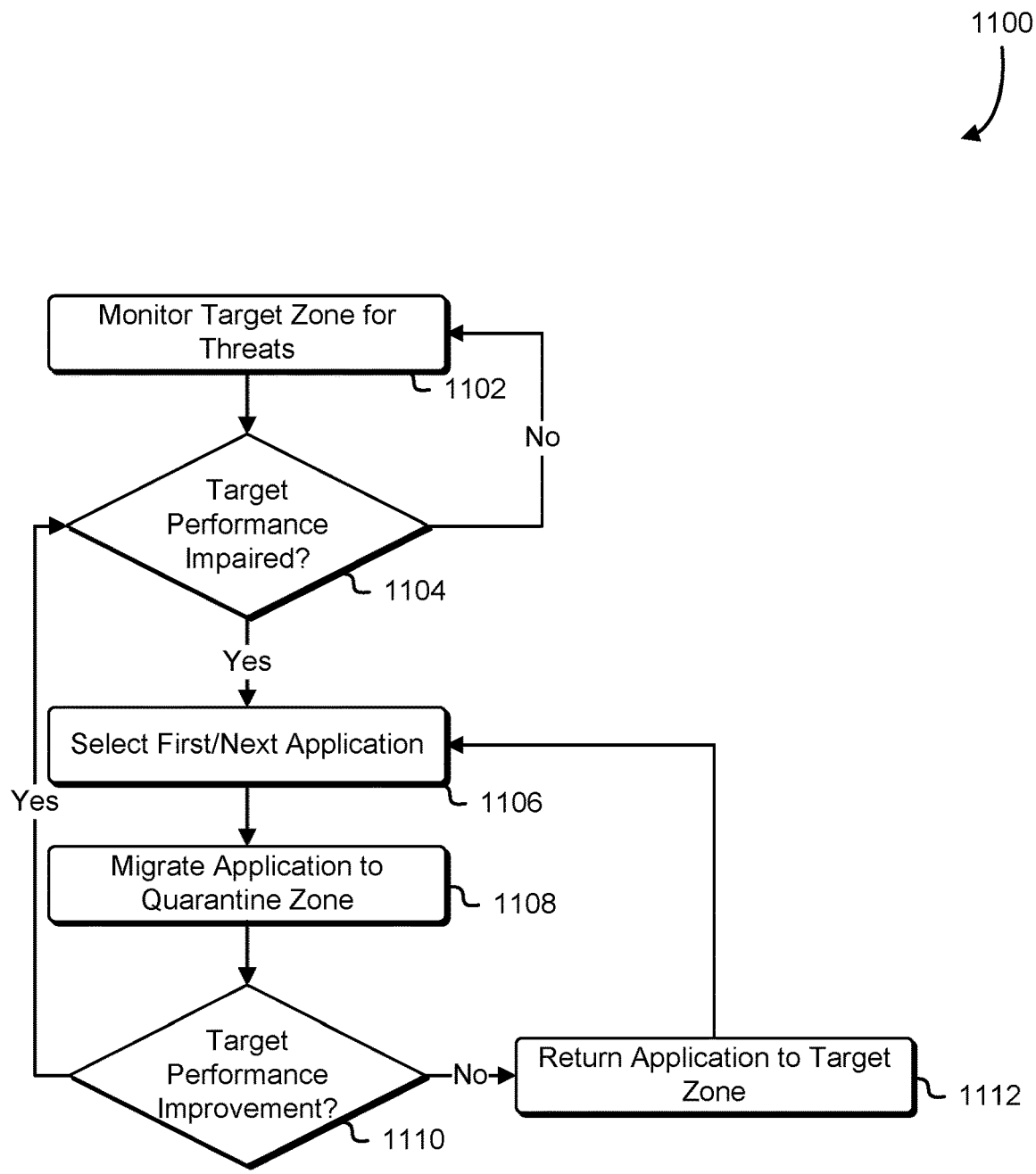
FIG. 11 is a flowchart that illustrates an example of identifying a threatening application in accordance with an embodiment.

FIG. 11 is a flowchart illustrating an example of a process 1100 for identifying applications causing security threats in accordance with various embodiments. Some or all of the process 1100 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1100 may be performed by any suitable system, such as a server in a data center, by various components of the environment 1200 described in conjunction with FIG. 12, such as the web server 1206 or the application server 1208, by multiple computing devices in a distributed system of a computing resource service provider, or by any electronic client device, such as the electronic client device 1202. The process 1100 includes a series of operations wherein applications are migrated out of the target zone in order to identify which of the applications may be negatively impacting a target application. The process 1100 may be a process for performing the flow depicted in FIG. 7.

In 1102, the system performing the process 1100 may be monitoring a particular zone to determine whether one or more target services or applications within the zone are being subjected to a denial of service attack and/or other security threat by other applications within the same target zone. In 1104, a determination is made whether a target application is a likely victim of a denial of service attack or other security attack by another application. If not, the system performing the process 1100 may return to 1102 and continue to monitor the zones for threats.

If it is determined that the target application is under attack, in 1106, the system performing the process 1100 may select a first software application of the applications within the target zone. In 1108, the system performing the process 1100, which may be a container migration service, may migrate the selected application to a quarantine zone, such as the quarantine zone 708 of FIG. 7. For a period, the system performing the process 1100 may again monitor the target application to determine whether migration of the selected application out of the target zone resulted in a performance improvement above a threshold for the target application. As it is contemplated that there may be situations where multiple applications within the target zone are attacking the target application, the threshold need only be of a level to distinguish between a legitimate performance impact from a legitimate (non-malicious) request versus performance impact caused by a malicious request.

In 1110, one or more measurements may be performed to determine whether the performance of the target application has improved as a result of migrating the application to the quarantine zone. The determination may include comparing differences of one or more factors, such as any or all of those discussed in conjunction with FIG. 2 (e.g., differences in processor usage of the target application, memory utilization of the target application, network traffic to or from the target application before and after the migration of the selected application from the target zone). If it is determined that the performance of the target application did not improve above a threshold, then it may be deemed likely that the application that was migrated to the quarantine zone in 1108 was not a cause of the target application's performance impairment. In such a case, the system performing the process may proceed to 1112, to migrate the selected application back to the target zone, and return to 1106 to select the next application to migrate. It must be noted, as described in conjunction with FIG. 2, the performance-impaired application need not necessarily be the application to which communications by an attacker or poorly designed application are being directed; that is, the application negatively impacted beyond the threshold may be a service utilized by the target application (e.g., monitoring service, logging collector of a software agent, DNS instance, etc.), rather than the target application itself. In some implementations, the quarantine zone is configured to utilize separate services than used by other zones.

Otherwise, if performance of the target application improved above a threshold due to migration of the application into a quarantine zone, the system performing the process 1100 may return to 1104 to determine whether the performance of the target application is still impaired below a threshold. If so, the system may determine that still other applications reside within the zone that are attacking or otherwise causing an unacceptable level of performance decrease of the target application. It can be seen that the process 1100 may be utilized for improving performance of a target application in general, besides just for denial of service mitigation. For example, one or more applications may be making legitimate requests of the target application, but such requests may, due to the reduced latency of being in the same zone as the target application, be placing an unacceptable burden on the target application. Therefore, migration of such applications to a different zone, thereby increasing the latency of communications between the applications and the target application, may cause an improvement in performance of the target application.

In the meantime, mitigation actions may be performed against applications now sequestered in the quarantine zone that were determined to have been impairing the performance of the target application. In some cases, if it is determined that the sequestered applications are denial of service attackers or otherwise high (e.g., threat level above a threshold) threats to the security and stability of other applications, the sequestered applications may be deleted or blocked from communicating with other applications. However, if the sequestered applications have not yet been determined to be a denial of service attacker or high threat, or if the sequestered applications are legitimate applications that would otherwise unacceptably burden the target application if running in the same zone, a mitigation action may be to keep the sequestered applications sequestered in the quarantine zone.

Note that one or more of the operations performed in 1102-12 may be performed in various orders and combinations, including in parallel. For example, the process 1100 may be performed for multiple zones (see FIG. 3) concurrently.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 12 illustrates aspects of an example environment 1200 for implementing aspects in accordance with various embodiments. As will be appreciated, although a web-based environment is used for purposes of explanation, different environments may be used, as appropriate, to implement various embodiments. The environment includes an electronic client device 1202, which can include any appropriate device operable to send and/or receive requests, messages, or information over an appropriate network 1204 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 1204 can include any appropriate network, including an intranet, the Internet, a cellular network, a local area network, a satellite network or any other network and/or combination thereof. Components used for such a system can depend at least in part upon the type of network and/or environment selected. Many protocols and components for communicating via such a network are well known and will not be discussed in detail. Communication over the network 1204 can be enabled by wired or wireless connections and combinations thereof. In this example, the network 1204 includes the Internet and/or other publicly-addressable communications network, as the environment includes a web server 1206 for receiving requests and serving content in response thereto, although for other networks an alternative device serving a similar purpose could be used as would be apparent to one of ordinary skill in the art.

The illustrative environment includes an application server 1208 and a data store 1210. It should be understood that there could be several application servers, layers or other elements, processes or components, which may be chained or otherwise configured, which can interact to perform tasks, such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 1208 can include any appropriate hardware, software and firmware for integrating with the data store 1210 as needed to execute aspects of one or more applications for the electronic client device 1202, handling some or all of the data access and business logic for an application. The application server 1208 may provide access control services in cooperation with the data store 1210 and is able to generate content including, text, graphics, audio, video, and/or other content usable to be provided to the user, which may be served to the user by the web server 1206 in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the electronic client device 1202 to provide the content in one or more forms including, forms that are perceptible to the user audibly, visually, and/or through other senses. The handling of all requests and responses, as well as the delivery of content between the electronic client device 1202 and the application server 1208, can be handled by the web server 1206 using PHP: Hypertext Preprocessor ("PHP"), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

The data store 1210 can include several separate data tables, databases, data documents, dynamic data storage schemes, and/or other data storage mechanisms and media for storing data relating to a particular aspect of the present disclosure. For example, the data store 1210 may include mechanisms for storing production data 1212 and user information 1216, which can be used to serve content for the production side. The data store 1210 also is shown to include a mechanism for storing log data 1214, which can be used for reporting, analysis or other purposes. It should be understood that there can be many other aspects that may need to be stored in the data store 1210, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. The application server 1208 may provide static, dynamic, or a combination of static and dynamic data in response to the received instructions. Dynamic data, such as data used in web logs (blogs), shopping applications, news services, and other applications may be generated by server-side structured languages as described or may be provided by a content management system ("CMS") operating on, or under the control of, the application server 1208. In one example, a user, through a device operated by the user, might submit a search request for a certain type of item. In this case, the data store 1210 might access the user information 1216 to verify the identity of the user and can access the catalog detail information to obtain information about items of that type. The information then can be returned to the user, such as in a results listing on a web page that the user is able to view via a browser on the electronic client device 1202. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the example environment 1200 in FIG. 12 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 1204 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 1204. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may be configured, for instance, with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A non-transitory computer-readable storage medium storing thereon executable instructions that, as a result of being executed by one or more processors of a computer system, cause the computer system to at least:
   receive metrics from a software agent executing on a physical host in which a first software container executes, the metrics including information regarding a network communication directed to a first software application executing in the first software container from a second software application executing in a second software container different from the first software container, the first software container and the second software container being managed through a container service provided by a computing resource service provider that controls the computer system;
   determine, based at least in part on the metrics, that a trigger for initiating migration of the second software application has been met, the migration being a process to move the second software application from a first zone to a second zone in a hierarchy of zones that would result in the second software application being in a more granular hierarchical proximity with respect to at least physical distance or a bandwidth to the first software application; and
   as a result of the trigger being met:
      compute, based at least in part on a determination of whether the network communication is associated with a denial of service attack, a denial of service threat level;
      as a result of the denial of service threat level being of a first severity, cause the second software application to be migrated to the second zone that allows for improved communications between the first software application and the second software application, wherein the denial of service threat level is of the first software application to the second software application;
      as a result of the denial of service threat level being of a second severity, delay migration of the second software application for a predetermined period; and
      as a result of the denial of service threat level being of a third severity, cause a denial of service mitigation action to be performed.

2. The non-transitory computer-readable storage medium of claim 1, wherein the first severity, the second severity, and the third severity are customizable by a customer associated with the first software application.

3. The non-transitory computer-readable storage medium of claim 1, wherein the second zone is a software container.

4. The non-transitory computer-readable storage medium of claim 1, wherein the denial of service threat level is further computed based at least in part on one or more of an amount of memory utilization, an amount of usage of one or more processors, or an amount of network usage.

5. The non-transitory computer-readable storage medium of claim 1, wherein the denial of service threat level is further computed based at least in part on performance metrics of a service utilized by the first software application.

6. A system, comprising:
   one or more processors; and
   memory including instructions that, as a result of execution by the one or more processors, cause the system to:
      receive metrics from a software agent executing on a physical host in which a first software container executes, the metrics including information regarding a network communication directed to a first software application executing in the first software container from a second software application executing in a second software container different from the first software container, the first software container and the second software container being managed through a container service provided by a computing resource service provider;
      determine, based at least in part on the metrics, that a trigger for initiating migration of the second software application has been met, the migration being a process to move the second software application from a first zone to a second zone in a hierarchy of zones that would result in the second software application being in a more granular hierarchical proximity with respect to at least physical distance or a bandwidth to the first software application; and
   as a result of the trigger being met:
      compute, based at least in part on a determination of whether the network communication is associated with a denial of service attack, a denial of service threat level;
      as a result of the denial of service threat level being of a first severity, cause the second software application to be migrated to the second zone that allows for improved communications between the first software application and the second software application, wherein the denial of service threat level is of the first software application to the second software application;

as a result of the denial of service threat level being of a second severity, delay migration of the second software application for a predetermined period; and as a result of the denial of service threat level being of a third severity, cause a mitigation action to be performed.

7. The system of claim 6, wherein the metrics are received from an agent executing on the physical host that is executing the first software application.

8. The system of claim 6, wherein the second zone is one of a data center, a server rack, physical computing system, a virtual machine instance, or a software container.

9. The system of claim 6, wherein the mitigation action includes one or more of:
   migrating the second software application to a second zone separate from a zone in which the first software application is executing, or
   blocking the second software application from communicating with the first software application.

10. The system of claim 6, wherein the instructions further include instructions that cause the system to:
   determine that the second software application is impairing performance of the first software application beyond a threshold; and
   identify the second application by causing the system to, for each application of ((the)) a plurality of different applications:
      migrate the application to the second zone;
      determine an amount of performance improvement of the first software application resulting from migrating the application; and
      as a result of the amount of performance improvement reaching a value relative to a threshold, determine that the application is one of the one or more applications impairing the performance of the first software application.

11. The system of claim 6, wherein the instructions further include instructions that cause the system to:
   receive additional metrics regarding a second network communication directed to the first software application from the second software application;
   compute, based at least in part on the additional metrics, a second threat level; and
   as a result of the second threat level being of a certain severity, cause the second software application to be migrated out of the second zone.

12. The system of claim 6, wherein:
   the first software application is hosted on computing resources of a computing resource service provider as a service to a customer of the computing resource service provider; and the service to the customer includes an interface that includes an option for allowing the customer to specify the first severity, the second severity, and the third severity.

13. The system of claim 6, wherein the instructions further include instructions that cause the system to, as a further result of the denial of service threat level being of the second severity or of the third severity:
   determine a digital fingerprint of the network communication directed from the second software application; and
   log, in association with the second software application, at least a portion of the digital fingerprint.

14. The system of claim 13, wherein the instructions further include instructions that cause the system to, as a further result of the denial of service threat level being of the third severity:
   receive second information regarding a second network communication directed to a third software application from an entity; and
   as a result of a determination that the second network communication is a match to the digital fingerprint, cause the mitigation action to be performed against the entity.

15. The non-transitory computer-readable storage medium of claim 1, wherein the second zone is determined based at least in part on a location of a third zone that contains the first software application.

16. A computer-implemented method, comprising:
   receiving metrics from a software agent executing on a physical host in which a first software container executes, the metrics including ring a network communication directed to a first software application executing in the first software container from a second software application executing in a second software container different from the first software container, the first software container and the second software container being managed through a container service provided by a computing resource service provider that controls;
   determining, based at least in part on the metrics, that a trigger for initiating migration of the second software application has been met, the migration being a process to move the second software application from a first zone to a second zone in a hierarchy of zones that would result in the second software application being in a more granular hierarchical proximity with respect to at least physical distance or a bandwidth to the first software application; and
   as a result of the trigger being met:
      computing, based at least in part on a determination of whether the network communication is associated with a denial of service attack, a denial of service threat level;
      as a result of the denial of service threat level being of a first severity, causing the second software application to be migrated to the second zone that allows for improved communications between the first software application and the second software application, wherein the denial of service threat level is of the first software application to the second software application;
      as a result of the denial of service threat level being of a second severity, delaying migration of the second software application for a predetermined period; and
      as a result of the denial of service threat level being of a third severity, causing a denial of service mitigation action to be performed.

17. The computer-implemented method of claim 16, wherein the second software application is migrated as a result of the denial of service threat level being of the first severity based at least in part on amount of performance improvement not reaching a value relative to a first threshold.

18. The computer-implemented method of claim 16, wherein performing the denial of service mitigation action includes one or more of:
   sequestering the second software application to run in the second zone, or blocking network communications from the second software application.

19. The computer-implemented method of claim 17, wherein the amount of performance improvement is measured based at least in part on a difference in one or more of processor usage, memory utilization, or network traffic.

20. The computer-implemented method of claim 16, wherein the metrics are received from the software agent executing that is executing on a same physical host as the second software application.

21. The computer-implemented method of claim 16, wherein the first software application and the second software application are executing in one or more software containers.

22. The computer-implemented method of claim 21, wherein the first zone is a software container in which the first software application and the second software application are executing.

\* \* \* \* \*